US012800695B2

(12) United States Patent
Ernström et al.

(10) Patent No.: US 12,800,695 B2
(45) Date of Patent: Nov. 17, 2026

(54) CIR PEAK THRESHOLD CONTROL FOR TOA ESTIMATION

(71) Applicant: Telefonaktiebolaget LM Ericsson (publ), Stockholm (SE)

(72) Inventors: Per Ernström, Stockholm (SE); Erik Stare, Sollentuna (SE); Siva Muruganathan, Stittsville (CA); Iana Siomina, Täby (SE); Florent Munier, Västra Frölunda (SE); Sara Modarres Razavi, Stockholm (SE); Muhammad Ali Kazmi, Sundbyberg (SE); Johannes Nygren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 717 days.

(21) Appl. No.: 18/018,915

(22) PCT Filed: Jul. 29, 2021

(86) PCT No.: PCT/EP2021/071354
§ 371 (c)(1),
(2) Date: Jan. 31, 2023

(87) PCT Pub. No.: WO2022/023509
PCT Pub. Date: Feb. 3, 2022

(65) Prior Publication Data

US 2023/0288547 A1 Sep. 14, 2023

Related U.S. Application Data

(60) Provisional application No. 63/059,381, filed on Jul. 31, 2020.

(51) Int. Cl.
*G01S 5/02* (2010.01)
*G01S 5/04* (2006.01)
(Continued)

(52) U.S. Cl.
CPC .............. *G01S 5/0221* (2013.01); *G01S 5/04* (2013.01); *G01S 11/02* (2013.01); *H04L 25/0212* (2013.01)

(58) Field of Classification Search
CPC . G01S 5/0221; G01S 5/04; G01S 5/06; G01S 11/02; G01S 11/04; H04L 25/0212
(Continued)

(56) References Cited

U.S. PATENT DOCUMENTS 5,359,575 A 10/1994 Williams et al.
7,672,412 B2 * 3/2010 Wu .................... H04L 25/0212 375/350
(Continued)

FOREIGN PATENT DOCUMENTS

CN 105190354 A 12/2015
CN 106879068 A 6/2017
(Continued)

OTHER PUBLICATIONS

Wei, X., et al., "UWB ranging algorithm based on dynamic threshold detection", Journal of Hefei University of Technology, vol. 41 No. 9, Sep. 2018, China Academic Journal Electronic Publishing House, pp. 1-7.
(Continued)

*Primary Examiner* — Chuong P Nguyen
(74) *Attorney, Agent, or Firm* — COATS & BENNETT, PLLC

(57) ABSTRACT

A threshold condition formed relative to the strongest peak (e.g., in a signaled DL-PRS-specific search window) is used in the search for the first peak to be used for Time of Arrival (TOA) estimation. Such a threshold condition may be used with DL-PRSs that are homogenous or inhomogeneous, and
(Continued)

in each of these combined (or not) with cyclic shifts. In so doing, the solutions 0 (100, 200, 300, 400) presented herein avoid detecting false peaks.

23 Claims, 11 Drawing Sheets

(51) Int. Cl.
*G01S 11/02* (2010.01)
*H04L 25/02* (2006.01)

(58) Field of Classification Search
USPC .................................................. 342/450, 458
See application file for complete search history.

(56) References Cited

U.S. PATENT DOCUMENTS

| | | | | |
|---|---|---|---|---|
| 8,989,772 | B2 * | 3/2015 | Krauss | G01S 5/0273 455/456.1 |
| 10,203,397 | B2 | 2/2019 | Sendonaris et al. | |
| 10,656,241 | B2 | 5/2020 | Ryden et al. | |
| 10,673,485 | B2 * | 6/2020 | Rydén | H04B 1/71072 |
| 11,187,773 | B2 * | 11/2021 | Rydén | G01S 5/0236 |
| 11,683,661 | B2 * | 6/2023 | Sundararajan | H04W 4/029 370/252 |
| 11,852,739 | B2 | 12/2023 | Ryden et al. | |
| 12,095,594 | B2 * | 9/2024 | Niewczas | H04L 25/0224 |
| 2019/0089405 | A1 | 3/2019 | Ryden et al. | |
| 2020/0217918 | A1 | 7/2020 | Ryden et al. | |
| 2024/0073850 | A1 * | 2/2024 | Yerramalli | G01S 5/0218 |
| 2024/0314000 | A1 * | 9/2024 | Niewczas | H04W 12/03 |
| 2024/0414026 | A1 * | 12/2024 | Srirama reddy Manjuladevi | H04L 25/0212 |
| 2024/0430843 | A1 * | 12/2024 | Duan | H04W 64/00 |
| 2025/0133529 | A1 * | 4/2025 | Peng | H04L 5/0048 |

FOREIGN PATENT DOCUMENTS

| | | | | | |
|---|---|---|---|---|---|
| CN | 109891260 | A | | 6/2019 | |
| WO | WO-2018083610 | A1 | * | 5/2018 | G01S 5/0236 |
| WO | WO-2021255190 | A1 | * | 12/2021 | G01S 1/08 |
| WO | WO-2026079996 | A1 | * | 4/2026 | H04W 72/0446 |

OTHER PUBLICATIONS

3rd Generation Partnership Project, "3rd Generation Partnership Project; Technical Specification Group Radio Access Network; LTE Positioning Protocol (LPP) (Release 16)", 3GPP TS 37.355 V16.0.0 (Mar. 2020), Technical Specification, pp. 1-281.

3rd Generation Partnership Project, "3rd Generation Partnership Project; Technical Specification Group Radio Access Network; NR; Physical channels and modulation (Release 15)", 3GPP TS 38.211 V1.0.0 (Sep. 2017), Technical Specification, pp. 1-37.

3rd Generation Partnership Project, "3rd Generation Partnership Project; Technical Specification Group Radio Access Network; NR; Physical layer measurements (Release 16)", 3GPP TS 38.215 V16.2.0 (Jun. 2020), Technical Specification, pp. 1-25.

Ericsson, "Corrections to NR positioning support", 3GPP TSG-RAN WG1 Meeting 101e, Elbonia, May 25-Jun. 5, 2020, R1-2005123.

* cited by examiner

*The gNB and ng-eNB may not always both be present

**When both the gNB and ng-eNB are present, the NG-C interface is only present for one of them

CIR PEAK THRESHOLD CONTROL FOR TOA ESTIMATION

RELATED APPLICATIONS

This application claims priority to U.S. Application No. 63/059,381, filed 31 Jul. 2020, disclosure of which is incorporated in its entirety by reference herein.

BACKGROUND

Positioning has been a topic in Long Term Evolution (LTE) standardization since Release 9 of the 3rd Generation Partnership Project (3GPP). The primary objective was initially to fulfill regulatory requirements for emergency call positioning but other use case like positioning for Industrial Internet of Things (I-loT) are becoming important. Positioning in New Radio (NR) is supported, e.g., by the architecture shown in FIG. 1. The Location Management Function (LMF) is the location node in NR. There are also interactions between the location node and the gNodeB via the NR Positioning Protocol A (NRPPa). The interactions between the gNodeB and the device is supported via the Radio Resource Control (RRC) protocol, while the location node interfaces with the User Equipment (UE) via the LTE Positioning Protocol (LPP). LPP is common to both NR and LTE. It will be appreciated that while FIG. 1 shows both a gNB and an ng-eNB, both may not always be present. Further, when both the gNB and the ng-eNB are present, the NG-C is generally only present for one of them.

In the legacy LTE standards, the following techniques are supported:

- Enhanced Cell ID. Essentially cell ID information to associate the device to the serving area of a serving cell, and then additional information to determine a finer granularity position.
- Assisted Global Navigation Satellite System (GNSS). GNSS information retrieved by the device, supported by assistance information provided to the device from Evolved Serving Mobile Location Center (E-SMLC).
- Observed Time Difference of Arrival (OTDOA). The device estimates the time difference of reference signals from different base stations and sends to the E-SMLC for multi-lateration.
- UTDOA (Uplink TDOA). The device is requested to transmit a specific waveform that is detected by multiple location measurement units (e.g. an eNB) at known positions. These measurements are forwarded to E-SMLC for multi-lateration In NR Rel. 16, a number of positioning features were specified.

A new DownLink (DL) reference signal, the NR DL Positioning Reference Signal (PRS) was specified. The main benefit of this signal in relation to the LTE DL PRS is the increased bandwidth, configurable from 24 to 272 Radio Bearers (RBs), which gives a big improvement in TOA accuracy. The NR DL PRS can be configured with a comb factor of 2, 4, 6, or 12, where comb-12 allows for twice as many orthogonal signals as the comb-8 LTE PRS. The NR DL PRS can also be beam swept.

In NR Rel. 16, enhancements of the NR UL Sounding Reference Signal (SRS) were specified. The Rel. 16 NR SRS for positioning allows for a longer signal, up to 12 symbols (compared to 4 symbols in Rel. 15), and a flexible position in the slot (only last six symbols of the slot can be used for SRS in Rel. 15). It also allows for a staggered comb Resource Element (RE) pattern for improved TOA measurement range and for more orthogonal signals based on comb offsets (comb 2, 4 and 8) and cyclic shifts. The use of cyclic shifts longer than the Orthogonal Frequency Division Multiplexed (OFDM) symbol divided by the comb factor is, however, not supported by Rel. 16 despite that this is the main advantage of comb-staggering at least in indoor scenarios. Power control based on neighbor cell Synchronization Signal Block (SSB)/DL PRS is supported as well as spatial Quasi-CoLocation (QCL) relations towards a Channel State Information Reference Signal (CSI-RS), an SSB, a DL PRS, or another Sounding Reference Signal (SRS).

In NR Rel. 16, the following UE measurements are specified

- DL Reference Signal Time Difference (RSTD), allowing for e.g. DL TDOA positioning
- Multi cell UE Rx-Tx Time Difference measurement, allowing for multi cell Round Trip Time (RTT) measurements
- DL PRS Reference Signal Receive Power (RSRP) In NR Rel. 16 the following gNB measurements are specified
- UpLink Relative Time of Arrival (UL-RTOA), useful for UL TDOA positioning
- gNb Rx-Tx time difference, useful for multi cell RTT measurements
- UL SRS-RSRP
- Angle of Arrival (AoA) and Zenith angle of Arrival (ZoA)

In December 2019, a NR Rel. 17 study item on positioning with focus on I-loT scenarios was initiated. One important problem to overcome in order to achieve the tough accuracy requirements associated with I-IoT is the positioning errors induced by UE TX timing errors that impact the accuracy of the UE Rx-Tx time difference measurement.

In NR Rel. 17, the topic of positioning integrity which is the consideration of both accuracy and reliability in the positioning solution would be discussed for the first time in 3GPP. While the integrity topic has been previously studied for Radio Access Technology (RAT)-independent positioning methods such as GNSS, in the solution presented herein, the consideration of positioning integrity Key Performance Indicators (KPIs) for RAT-based positioning methods are also within the scope.

An OFDM symbol in time can be written as a Fourier expansion of the subcarrier symbols $c_k$ as:

$$h(t)=\sum_{k=0}^{N-1} c_k e^{j\cdot 2\pi\cdot k\cdot \Delta f\cdot t},\ \text{for } 0\le t<T$$

where T represents the OFDM symbol time and $\Delta f=1/T$ represents the subcarrier spacing. Note that the periodicity of the Fourier expansion basis functions $e^{j\cdot 2\pi\cdot k\cdot \Delta f\cdot t}$ is:

$$\frac{1}{k\cdot\Delta f}=\frac{T}{k}$$

except for the constant basis function (k=0).

For a comb-n signal with zero subcarrier offset we have $c_k\neq 0$ only for k=n*m for some integer m. Then all basis functions for which $c_k\neq 0$ are periodic with period T/n, and thus h(t) is periodic with period T/n. This can also be seen from the fact that the Fourier expansion can be reinterpreted as a Fourier expansion with subcarrier spacing n $\Delta f$ and OFDM symbol length T/n (removing the terms that are anyway zero).

For a comb-n signal with subcarrier offset s we have $c_k \neq 0$ only for k=s+n*m for some integer m. By extracting a factor $e^{j \cdot 2\pi \cdot s \cdot \Delta f \cdot t}$ from the Fourier expansion we see that:

$$h(t)=e^{j \cdot 2\pi \cdot s \cdot \Delta f \cdot t} \cdot g(t)$$

where g(t) is periodic with period T/n.

To estimate the TOA, the UE can first estimate the channel impulse response and next identify the first peak in the power delay profile of the Channel Impulse Response (CIR). The estimation of the CIR can be performed in many different ways, e.g., in the time domain through cyclic correlation with the known transmitted signal or (mathematically equivalently) in the frequency domain through the following steps:

- Fast Fourier Transform (FFT) to frequency domain
- Multiply each subcarrier symbol with the complex conjugate of the corresponding subcarrier symbol of the known transmitted signal
  - If the known transmitted signal is not constant amplitude in the frequency domain one also needs to divide by the amplitude of the known signal for each subcarrier.
- Inverse Fast Fourier Transform (IFFT) back to time domain The CIR could also be estimated through a non-cyclic correlation with the known transmitted signal which gives approximately the same result as a cyclic correlation for delays that are small relative to the symbol length.

If cyclic correlation (or the equivalent method in the frequency domain) is used, the periodicity (up to a phase rotation) of the known transmitted signal will result in a corresponding periodicity (up to a phase rotation) of the CIR estimate. This is easily understood since the channel impulse response will itself be a comb-n signal. The CIR can, thus, be written as:

$$h(t)=e^{j \cdot 2\pi \cdot s \cdot \Delta f \cdot t} \cdot g(t)$$

where g(t) is periodic with period T/n.

Also when the non-cyclic correlation method is used to estimate the CIR, false peaks appear in a similar way due to the periodic structure of the known transmitted signal, as shown in FIG. 2, which shows the absolute value of a correlation of a known transmitted comb-4 signal with the signal received over an Additive White Gaussian Noise (AWGN) channel. These peaks will be suppressed relative to the main peak, but not radically much. The suppression of the $m^{th}$ additional peak compared to the main peak is roughly by a factor of (n−m)/n.

For a general comb-n signal h(t) we have:

$$h(t)=e^{j \cdot 2\pi \cdot k \cdot \Delta f \cdot t} \cdot g(t)$$

where g(t) is periodic with period T/n. The autocorrelation can then be written as:

$$c(\tau) = \int_0^T h(t)h^*(t-\tau)dt = e^{j \cdot 2\pi \cdot s \cdot \Delta f \cdot \tau} \int_0^T g(t)g^*(t-\tau)dt.$$

Because the phase factor $e^{j \cdot 2\pi \cdot s \cdot \Delta f \cdot t}$ does not impact the magnitude of the autocorrelation, the general comb signal will also have additional peaks for time offsets m·(T/n) relative to the main peak of the same size as for a periodic function. Taking the Cyclic Prefix (CP) into account, the additional correlation peaks will be somewhat more suppressed, but not radically much as long as the CP length is much shorter than the OFDM symbol length.

Regardless of whether the TOA estimation is based on linear or cyclic (CIR) correlation, the measurement range has to be limited to a TOA interval of length T/n to avoid misdetecting a side peak as a real peak. Even with such a limitation of the measurement range, channel peaks with large delays may be periodically mapped into the UE search window and be falsely detected as a first peak. Thus, there remains a need for improved peak detection used for TOA.

SUMMARY

A solution presented herein uses a threshold condition formed relative to the strongest peak in (e.g., in a signaled DL-PRS-specific search window) the search for the first peak to be used for Time of Arrival (TOA) estimation. Such a threshold condition may be used with DL-PRSs that are homogenous or inhomogeneous, and in each of these combined (or not) with cyclic shifts. The main advantage in all cases is to avoid detecting false peaks.

One exemplary embodiment comprises a method of estimating a Time of Arrival (TOA) by a wireless node in a wireless communication network. The method comprises receiving one or more reference signals from one or more remote wireless nodes, and estimating a Channel Impulse Response (CIR) responsive to the received one or more reference signals. The method further comprises identifying as a TOA peak a first peak of the CIR in time within a search window that satisfies a threshold condition. The threshold condition is defined responsive to a strength of a dominant peak of the CIR within the search window. The method further comprises estimating the TOA from the TOA peak.

In exemplary embodiments, the threshold condition is whether a candidate peak of the CIR within the search window exceeds a peak threshold defined responsive to the strength of the dominant peak.

In exemplary embodiments, the peak threshold is defined responsive to the strength of the dominant peak and an adjustment value.

In exemplary embodiments, the peak threshold is defined as the strength of the dominant peak reduced by the adjustment value.

In exemplary embodiments, the peak threshold is defined responsive to the strength of the dominant peak and an adjustment function, said adjustment function comprising a function of a time difference between a dominant peak time and a candidate peak time.

In exemplary embodiments, the adjustment function further comprises the function of the time difference between the dominant peak time and the candidate peak time as modified by an adjustment value.

In exemplary embodiments, the adjustment function comprises a function inversely proportional to a square of the time difference.

In exemplary embodiments, the peak threshold comprises a candidate peak threshold for each candidate peak in the search window including the dominant peak, where each candidate peak threshold is defined responsive to an adjustment function and a strength of the corresponding candidate peak and all preceding peaks in the search window and a corresponding adjustment function for each of the preceding peaks. The adjustment function comprises a function of a time difference between the candidate peak and the corresponding preceding peak. Further, identifying as the TOA peak the first peak in time within the search window that satisfies the threshold condition comprises iteratively comparing a strength of each candidate peak to the corresponding candidate peak threshold condition until no earlier candidate peaks exceeding the corresponding candidate peak threshold remain, and identifying the last candidate peak to exceed the corresponding candidate peak threshold as the TOA peak.

Exemplary embodiments further comprise calculating the peak threshold.

Exemplary embodiments further comprise receiving the adjustment value from at least one of the one or more remote wireless nodes or from another node within the wireless communication network.

Exemplary embodiments further comprise determining the adjustment value responsive to one or more rules preconfigured for the wireless node. In exemplary embodiments, the one or more rules comprise one or more rules preconfigured per positioning reference signal, preconfigured per remote wireless node, and/or preconfigured per frequency.

In exemplary embodiments, the adjustment value is determined from a reference adjustment value and one or more compensation factors.

In exemplary embodiments, the one or more compensation factors are associated with a reference signal configuration for the reference signal for which the CIR is estimated.

Exemplary embodiments further comprise adjusting the reference adjustment value using the one or more compensation factors to determine the adjustment value.

Exemplary embodiments further comprise receiving the reference adjustment value from at least one of the one or more remote wireless nodes or from another node within the wireless communication network.

Exemplary embodiments further comprise receiving the one or more threshold adjustments from at least one of the one or more remote wireless nodes or from another node within the wireless communication network.

In exemplary embodiments, the defining the threshold condition comprises defining the threshold condition responsive to one or more rules preconfigured for the wireless node.

In exemplary embodiments, the one or more rules comprise one or more rules preconfigured per positioning reference signal, preconfigured per remote wireless node, and/or preconfigured per frequency.

In exemplary embodiments, the peak threshold is calculated responsive to the strength of the dominant peak and at least one of a size of the search window; a number of the one or more reference signals received from the one or more remote wireless nodes; a comb configuration of each of the received one or more reference signals; a reference signal density in frequency; a reference signal density in time; a reference signal bandwidth; a number of repetitions of a reference signal within a reference signal period; and one or more characteristics of a wireless channel conveying the one or more reference signals to the wireless node.

Exemplary embodiments further comprise coherently and jointly processing reference signals received via a plurality of frequency layers, wherein the estimating the CIR comprises estimating the CIR within the search window responsive to the coherently and jointly processed reference signals.

In exemplary embodiments, coherently and jointly processing reference signals received via a plurality of frequency layers comprises a first coherently and jointly processing of the reference signals received from a first remote wireless node via a first plurality of frequency layers and a second coherently and jointly processing of the reference signals received from a second remote wireless node via a second plurality of frequency layers. Further, estimating the CIR comprises estimating a first CIR within the search window responsive to the first coherently and jointly processed reference signals and estimating a second CIR within the search window responsive to the second coherently and jointly processed reference signals. Further, defining the threshold condition comprises defining a first threshold condition responsive to a strength of a dominant peak of the first CIR within the search window and defining a second threshold condition responsive to a strength of a dominant peak of the second CIR within the search window.

In exemplary embodiments, the strength of any peak in the search window comprises one of a peak value in a power delay profile of the CIR at a given sampling frequency; a peak value in a power delay profile of the CIR after interpolation between samples; a power delay profile of the CIR integrated over a period of time around the corresponding peak; a power delay profile of the CIR summed over a number of samples around the corresponding peak; and a power delay profile of the CIR averaged over a number of samples around the corresponding peak.

In exemplary embodiments, the power delay profile comprises an absolute square of the CIR.

In exemplary embodiments, the power delay profile comprises an absolute value of the CIR.

In exemplary embodiments, at least one of the one or more remote wireless nodes comprises a network node, and wherein the receiving of the one or more reference signals comprises receiving one or more downlink reference signals from the network node.

In exemplary embodiments, at least one of the one or more remote wireless nodes comprises a User Equipment (UE), and wherein the receiving of the one or more reference signals comprises receiving one or more uplink reference signals from the UE.

One exemplary embodiment comprises a wireless node in a wireless communication system configured to estimate a Time of Arrival (TOA) or one or more reference signals received from one or more remote wireless nodes. The wireless node comprises one or more processing circuits configured to receive one or more reference signals from one or more remote wireless nodes, and estimate a Channel Impulse Response (CIR) responsive to the received one or more reference signals. The one or more processing circuits are further configured to identify as a TOA peak a first peak of the CIR in time within a search window that satisfies a threshold condition. The threshold condition is defined responsive to a strength of a dominant peak of the CIR within the search window. The one or more processing circuits are further configured to estimate the TOA from the TOA peak.

One exemplary embodiment comprises a computer program product for controlling a wireless node. The computer program product comprising software instructions which, when run on at least one processing circuit in the wireless node, causes the wireless node to receive one or more reference signals from one or more remote wireless nodes, and estimate a Channel Impulse Response (CIR) responsive to the received one or more reference signals. When run on the at least one processing circuit, the software instructions further cause the wireless node to identify as a TOA peak a first peak of the CIR in time within a search window that satisfies a threshold condition. The threshold condition is defined responsive to a strength of a dominant peak of the CIR within the search window. When run on the at least one processing circuit, the software instructions further cause the wireless node to estimate the TOA from the TOA peak. In exemplary embodiments, a computer-readable medium comprises the computer program product. In exemplary embodiments, the computer-readable medium comprises a non-transitory computer readable medium.

One exemplary embodiment comprises a method performed by a wireless device in a communication network. The method comprises receiving a reference signal from a node within the communication network. The method further comprises receiving an indication of a threshold parameter representing an adjustment to be applied by the wireless device to a set of one or more paths of a channel impulse response (CIR) of the reference signal for generating a path detection threshold for detecting the first path in time of the CIR within a search window.

Exemplary embodiments further comprise the step of using the threshold parameter to calculate an arrival time of the reference signal from the first path in time of the CIR within the search window exceeding the path detection threshold.

In exemplary embodiments, the indication of the threshold parameter is received as part of assistance data for the reference signal.

In exemplary embodiments, the assistance data further comprises the duration of the search window.

Exemplary embodiments further comprise receiving an indication of a threshold parameter representing the adjustment to be applied to the strongest path of the CIR response within the search window.

One exemplary embodiment comprises a method performed by a network node in a communication network. The method comprises transmitting a reference signal to a wireless device within the communication network. The method further comprises transmitting an indication of a threshold parameter representing an adjustment to be applied by the wireless device to a set of one or more paths of a channel impulse response (CIR) of the reference signal for generating a path detection threshold for detecting the first path in time of the CIR within a search window.

In exemplary embodiments, the indication of the threshold parameter is transmitted as part of assistance data for the reference signal.

In exemplary embodiments, the assistance data further comprises the duration of the search window.

Exemplary embodiments further comprise transmitting an indication of a threshold parameter representing the adjustment to be applied to the strongest path of the CIR response within the search window.

DETAILED DESCRIPTION

Figure 1:
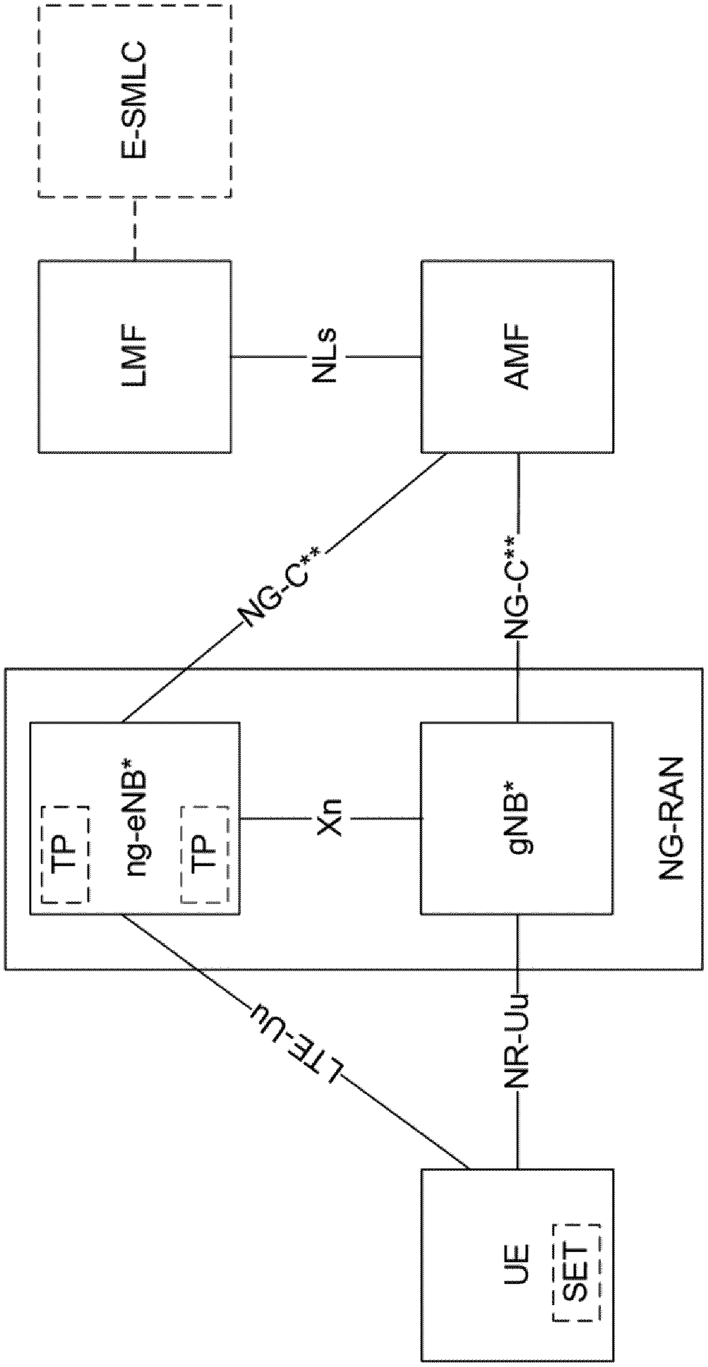
FIG. 1 shows a block diagram of an exemplary communication network applicable for the solution presented herein.
Figure 2:
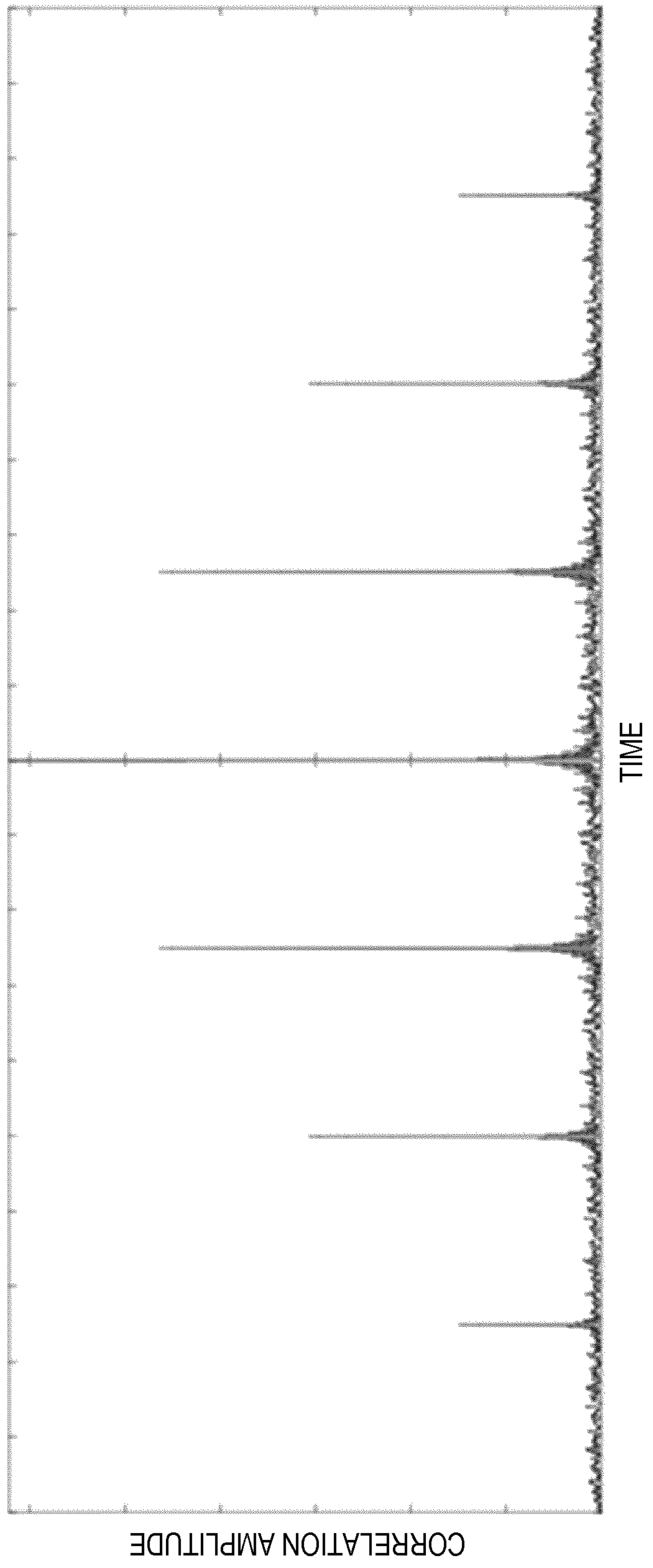
FIG. 2 demonstrates false peaks that may occur for an exemplary CIR.

There are various problems with conventional TOA techniques. For example, the following scenarios may result in large positioning errors:

- For a non-staggered or not fully staggered DL PRS, side peaks in the estimated CIR may be mis-detected as real peaks.
- For a staggered DL PRS where doppler spread prohibits coherent combination of the staggered DL PRS, side peaks in the estimated CIR may be mis-detected as real peaks.
- For a fully staggered DL PRS that is coherently combined achieving homogeneity in frequency, side peaks in the estimated CIR may be mis-detected as real peaks, which may result in large positioning errors if the delay is very long (i.e., larger than the symbol time).
- Side peaks in the estimated CIR due to distortions of the transmitted DL PRS due to, e.g., D/A converters, filters, or pulse shaping, may be mis-detected as real peaks.
- Side peaks in the estimated CIR due to the limited bandwidth of the transmitted signal may be mis-detected as real peaks.
- Side peak issues prohibit the use of DL PRSs that are non-homogenous in frequency, e.g., a one symbol comb-12 signal which in turn results in reduced positioning performance or increased positioning overhead in some scenarios, e.g., indoor scenarios.
- Side peaks are one of the sources of reducing the reliability and integrity of positioning estimation as they may be mis-detected as real peaks.

There are also problems with the case where different DL-PRSs are constructed by applying different Cyclic Shifts (CSs) on a common signal that is homogenous or non-homogenous in frequency. Because the DL-PRSs only differ by the cyclic shifts, the respective estimated CIRs may also be correspondingly cyclically shifted and the UE may, in the first instance, observe a single long CIR consisting of the superposition of all elementary CIRs. To be able to properly process the received PRSs, the UE therefore has to segment the time axis into different portions corresponding to the true CIRs of the respective PRSs and then use each segment to determine the first path of this. There is, however, a risk that this segmentation is not done fully correctly, which may result in a late component being falsely considered to be the first path of the following CIR.

According to the solution presented herein, the TOA estimation, used e.g., for the RSTD or UE Rx-TX time difference measurement or for TOA estimation for the reference cell or reference PRS, the UE detects the first CIR peak which is higher in power than a threshold value relative to the strongest detected peak in the CIR (a CIR peak might also be referred to herein as a "path"). In one embodiment, the relative threshold value is configured through signaling, e.g., over LPP. In one embodiment, the relative threshold value is preconfigured, either as one fixed value or as a value which depends on other configuration parameters, e.g., configuration parameters of the DL PRS used for the TOA estimation. In one embodiment, the threshold value is a function of the distance in time (delay) between the potential first peak and the strongest peak. In one embodiment, the threshold value is based on multiple detected peaks and is calculated based on the distances in time (delay) between the potential first peak and the other peak as well as on the strength of the other peaks. In one embodiment, the use of a peak strength threshold as described above is combined with the use of a DL PRS which is non-homogenous in frequency, e.g. a one symbol comb-12 signal. In one embodiment, the threshold value is a function or a KPI of the positioning integrity of either the network or the device in terms of positioning estimation. The embodiments are described for DL measurements but are also applicable for UL measurements at a radio network node, e.g., at gNB, Transmission-Reception Point (TRP), LMU, etc., instead of at the UE. The threshold can be determined by the network node (e.g., based on similar rules described for the UE) or configured by another node, e.g. by the LMF or a controlling network node, e.g. via the NRPPa or other relevant protocol.

Figure 3:
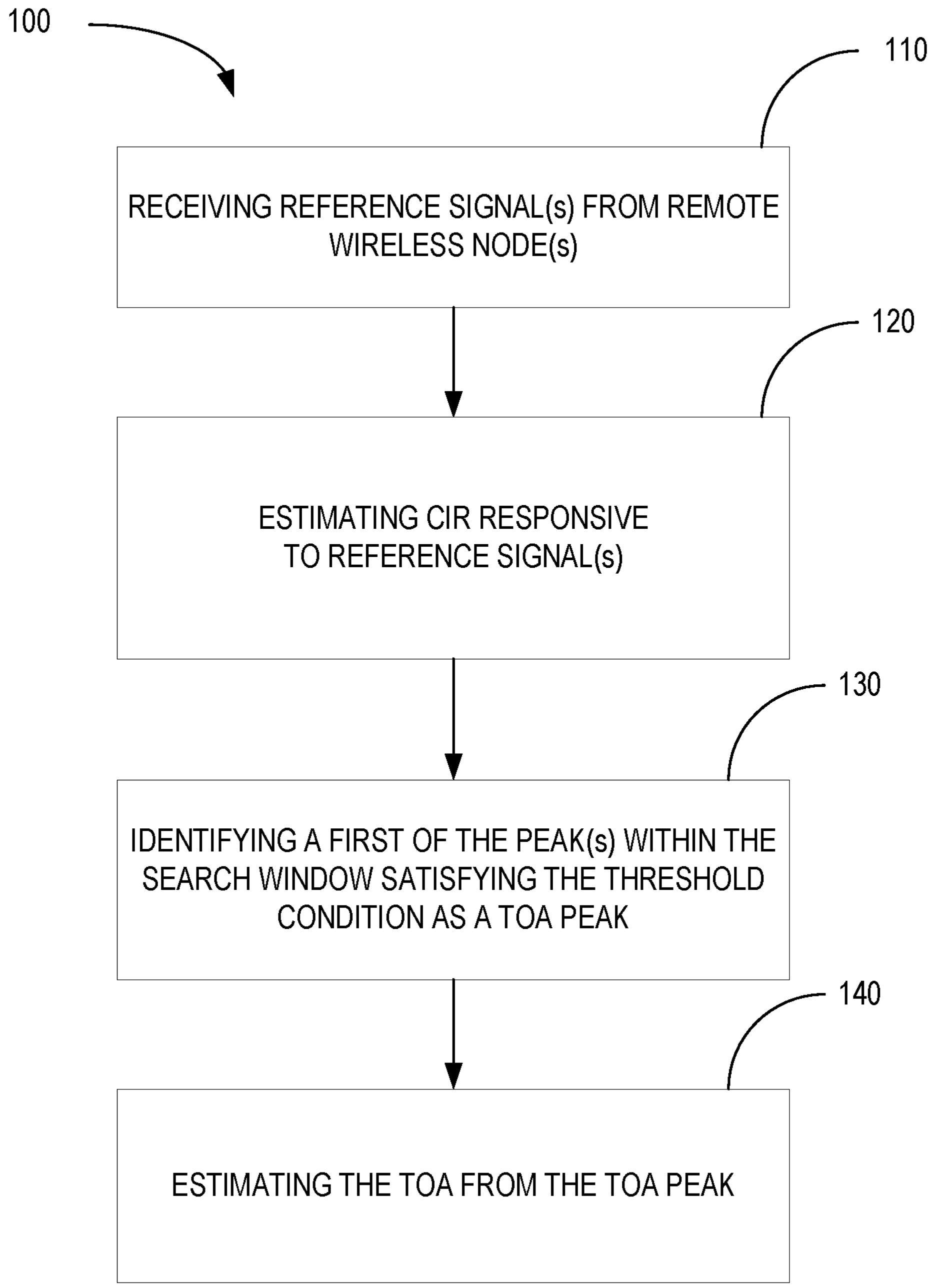
FIG. 3 shows an exemplary method according to embodiments of for the solution presented herein.

FIG. 3 shows one exemplary method 100 of estimating a Time of Arrival (TOA) by a wireless node in a wireless communication network according to the solution presented herein that broadly represents each of these embodiments. Method 100 may be implemented by any wireless node in the wireless communication network, including but not limited to the UE, the LMF, a base station node, e.g., gNB or ng-eNB. The method 100 comprises receiving one or more reference signals from one or more remote wireless nodes (block 110), and estimating a CIR responsive to the received one or more reference signals (block 120). The method 100 further comprises identifying as a TOA peak a first peak in time within a search window (e.g., the earliest peak in time within the search window) that satisfies a threshold condition (block 130). The threshold condition is defined responsive to a strength of a dominant peak of the CIR within the search window. The method 100 further comprises estimating the TOA from the TOA peak (block 140). The following provides further details for each of multiple embodiments for the solution presented herein.

Broadly, for TOA measurements used, e.g., for UE RSTD measurements or UE RX-TX time difference measurements, the UE first estimates the CIR and then identifies the earliest peak in the power delay profile of the estimated CIR. The search for the first peak is limited to a search window in time which is signaled to the UE, e.g., over LPP as defined for NR in Rel. 16. The location in time of the first peak within the search window defines the TOA for the PRS. The solution presented herein limits the UE search for the first peak to peaks that satisfy a threshold condition that depends on strength of the strongest peak (i.e., the dominant peak) within the search window, and in some embodiments also depends on a location in time of the dominant peak or relative to a set of stronger peaks.

In one exemplary embodiment the threshold condition is a threshold relative to the strength of the dominant peak, i.e., the strongest peak, and represents a delay independent threshold condition. A candidate peak in the CIR is detected as a peak if in logarithmic scale candidate peak strength>dominant peak strength−adjustment value (e.g., derived from a relative threshold). In a linear scale, this can equivalently be written as:

$$P_{candidate\_peak} > R \cdot P_{dom\_peak}$$

where R represents the adjustment value, $P_{dom\_peak}$ represents the dominant peak strength, and $P_{candidate\_peak}$ represents the candidate peak strength. For example, R may be given by:

$$R = 10^{-relative\_threshold\_value/10}$$

Figure 4:
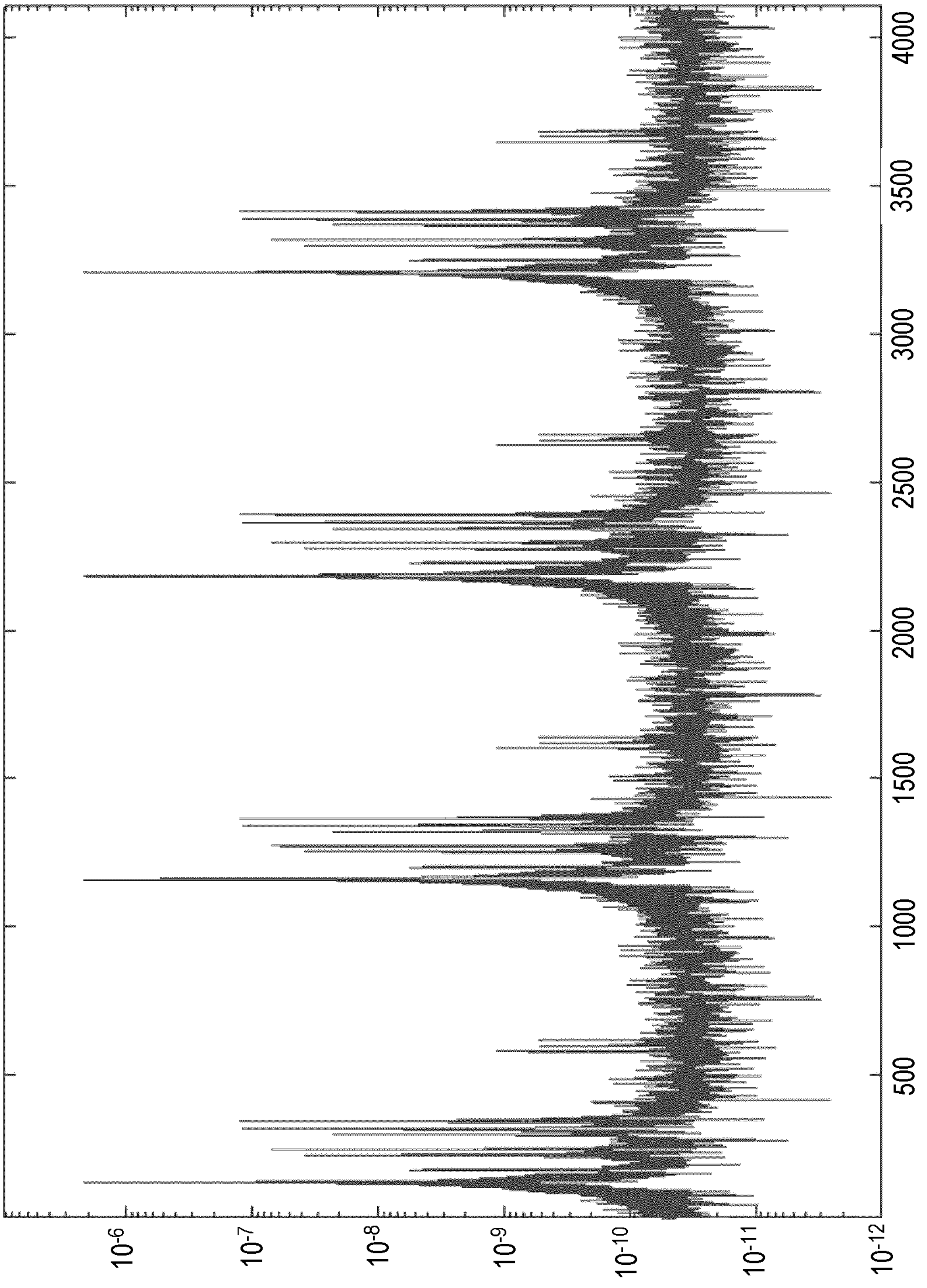
FIG. 4 shows an exemplary power delay profile.

The signaled parameter or the parameter to determine by the UE according to the rules described herein can be R, or any parameter(s) used to derive R. This type of threshold is useful to reject peaks with delays that are longer than the measurement range, and thus appear in the estimated CIR at the wrong delay since they are periodically mapped into the measurement range, as explained in the background section and in FIG. 4. Such peaks with large delays are typically much weaker than the strongest peak and can thus be effectively rejected with a threshold relative to the strongest peak (e.g., a threshold defined using the strongest peak). More particularly, FIG. 4 shows an example of estimated power delay profile based on a single symbol comb-4 reference signal with 100 MHz bandwidth and 30 kHz subcarrier spacing using 4096 samples per OFDM symbol. Due to the comb-4 structure, the estimated power delay profile is periodic with a period, which is one-fourth of the OFDM symbol length. The TOA measurement range is thus also limited to one-fourth of the OFDM symbol length. A channel peak with delay outside the measurement range is mapped periodically into the measurement range (the first quarter of the power delay profile) and may be mis-detected as a false first peak. This type of threshold can also be used to reject side peaks, but because the threshold is independent of the delay, it does not utilize the fact that side peaks get weaker with the distance (in delay) from the real channel peak.

From the UE's perspective, the TOA estimation may subsequently be done, e.g., as follows:

- The UE is configured over LPP with a number of DL PRSs, including parameters defining a search window (e.g., as defined for NR in Rel. 16) and parameters defining the threshold (unless preconfigured).
- The UE is configured over LPP to perform RSTD and/or UE Rx-Tx time difference measurements based on the configured DL PRSs.
- For each DL PRS, the UE estimates the CIR within the search window
- The UE identifies the strongest peak in the CIR power delay profile within the search window.
- The UE estimates the strength of the identified strongest peak in the CIR power delay profile within the search window.
- The UE identifies the first peak in the CIR power delay profile within the search window which is above a threshold relative to the strongest peak, e.g., candidate peak strength strongest peak strength—adjustment value.
- The UE reports the RSTD and/or UE Rx-Tx time difference measurements based on the identified first peak in the CIR power delay profile within the search window that is above a threshold relative to the strongest peak.

A threshold relative to the strength of the strongest peak may also be combined with a threshold relative to an estimated noise level. This can be useful because, to some extent, they serve different purposes (the purpose of a threshold relative to an estimated noise level being to reject noise peaks) as described herein further below.

In another exemplary embodiment, the threshold is a delay dependent threshold relative to the dominant peak. For example, a candidate peak may be detected as a peak if (in linear scale) it satisfies the following threshold condition:

$$P_{candidate\ peak} > R \cdot f(\tau) \cdot P_{dom\_peak}$$

where r represents the difference in time between the dominant peak and the candidate peak. In one embodiment, the adjustment function $f(\tau)$ may be represented as:

$$f(\tau) = \frac{a}{\tau^2}$$

where a is a constant. It will be appreciated that while the adjustment value R is shown as separate from the adjustment function, the threshold condition may alternatively be represented by:

$$P_{candidate\ peak} > f(\tau) \cdot P_{dom\_peak},$$

where the adjustment function $f(\tau)$ is alternatively represented by:

$$f(\tau) = \frac{R \cdot a}{\tau^2}$$

The constant $\sigma$ may be set to 1 in some examples because a may be absorbed into R. Still it may be convenient to set a to a value of the order of $1/BW^2$, where BW represents the bandwidth of the DL PRS, or alternatively represents the system bandwidth, where R is signaled in linear or logarithmic scale. Alternatively, both a and R may be preconfigured. The signaled parameter(s) or the parameter(s) to determine by the UE according to the rules described for this embodiment can be R, $f$, or any parameter(s) used to derive R, $f$, or the combination $R \cdot f(\tau)$ It is important to note that an ideal low pass filter may be represented by:

$$\frac{1}{BW} rect(f/BW)$$

which corresponds to $\mathrm{sinc}(BW \cdot \tau)$ in the time domain, and that:

$$|\mathrm{sinc}(BW \cdot \tau)| < \frac{1}{\pi \cdot BW \cdot \tau}.$$

From UE perspective the TOA estimation may then be done, e.g., as follows:

- The UE is configured over LPP with a number of DL PRSs including parameters defining a search window (e.g., as defined for NR in Rel. 16) and parameters defining the threshold (unless preconfigured).
- The UE is configured over LPP to perform RSTD and/or UE Rx-Tx time difference measurements based on the configured DL PRSs.
- For each DL PRS, the UE estimates the CIR within the search window.
- The UE identifies the strongest peak in the CIR power delay profile within the search window as the dominant peak.
- The UE estimates the strength $P_{dom\_peak}$ of the identified strongest peak in the CIR power delay profile within the search window.
- The UE identifies the first peak in the CIR power delay profile within the search window which satisfies the threshold condition:

$$P_{candidate\_peak} > R \cdot f(\tau) \cdot P_{dom\_peak}$$

where the threshold condition depends both on the strength of the dominant peak $P_{dom\_peak}$ and the adjustment function, which depends on the distance in time r between the candidate first peak and the dominant peak.

- The UE reports RSTD and/or UE Rx-Tx time difference measurements based on the identified first peak in the CIR power delay profile within the search window which is above a threshold relative to the dominant peak.

This type of delay-dependent threshold is useful to reject side peaks due to the limited bandwidth used for the signal, filter effect, etc. More particularly, this type of delay-dependent threshold makes use of the fact the side peaks get weaker the farther away they are (in delay) from the real channel peak. Thus, one can avoid using an unnecessarily high threshold far away from the real channel peak.

Figure 5:
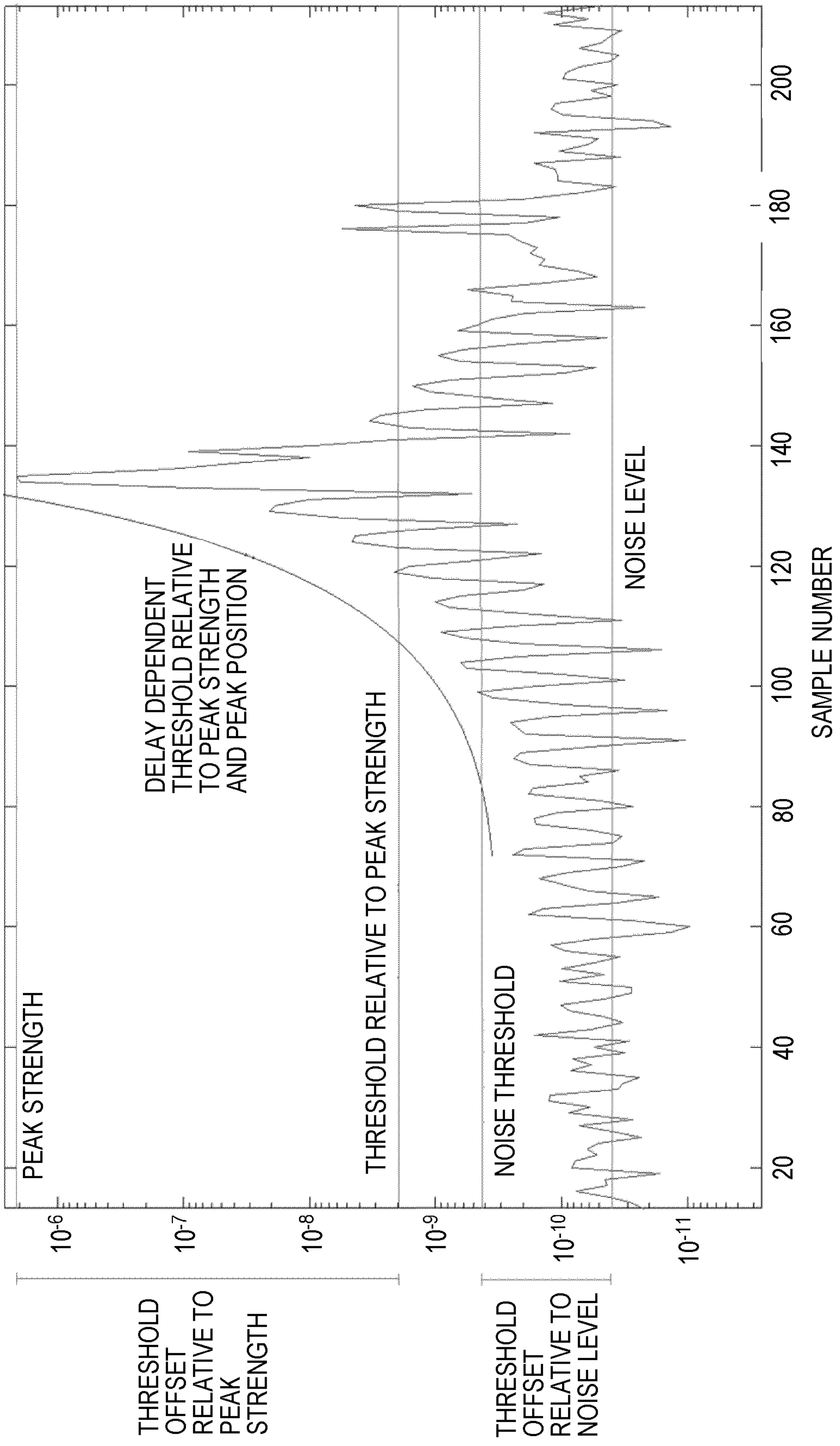
FIG. 5 shows an example of threshold determination for the power delay profile of FIG. 4 according to exemplary embodiments of the solution presented herein.

FIG. 5 demonstrates this by showing a close-up of the strongest peak (which is also the first peak) in the power delay profile shown in 4. The strongest peak clearly has sinc-like side peaks that can be effectively rejected utilizing a delay dependent threshold relative to the peak strength and peak position (in delay) relative to the real channel peak.

A delay dependent threshold condition may be combined with a delay independent threshold condition, e.g., as described above. This can be useful because, to some extent, they serve different purposes. By utilizing a combination of a delay dependent and a simple threshold, the simple threshold can potentially be set to a higher value since it does not have to reject side peaks. This reduces the risk of missing to detect a real channel peak. A delay-dependent threshold may also be combined with a threshold relative to an estimated noise level as described further below herein.

Figure 6:
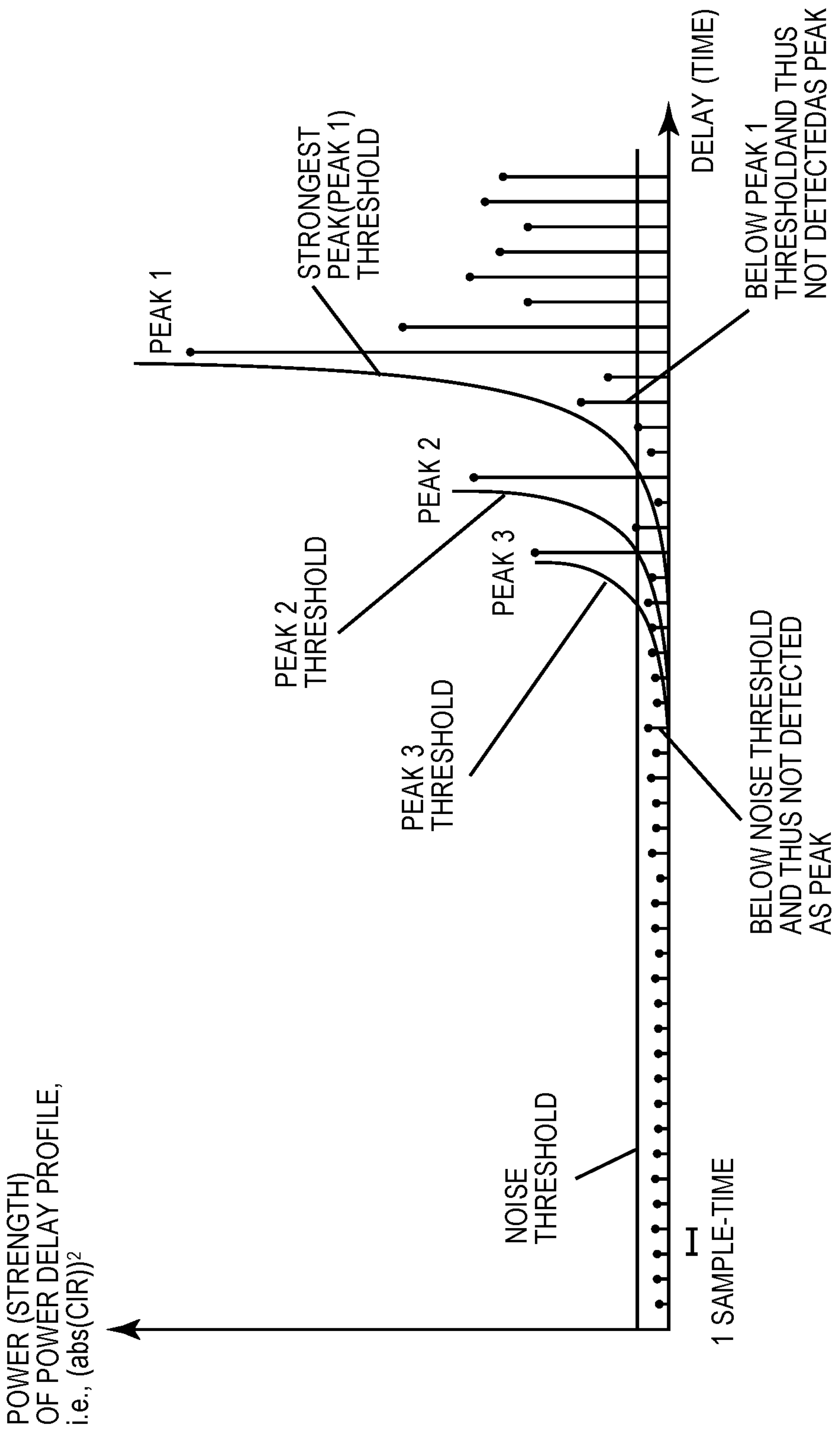
FIG. 6 shows an exemplary CIR and corresponding threshold conditions according to exemplary embodiments of the solution presented herein.
Figure 7:
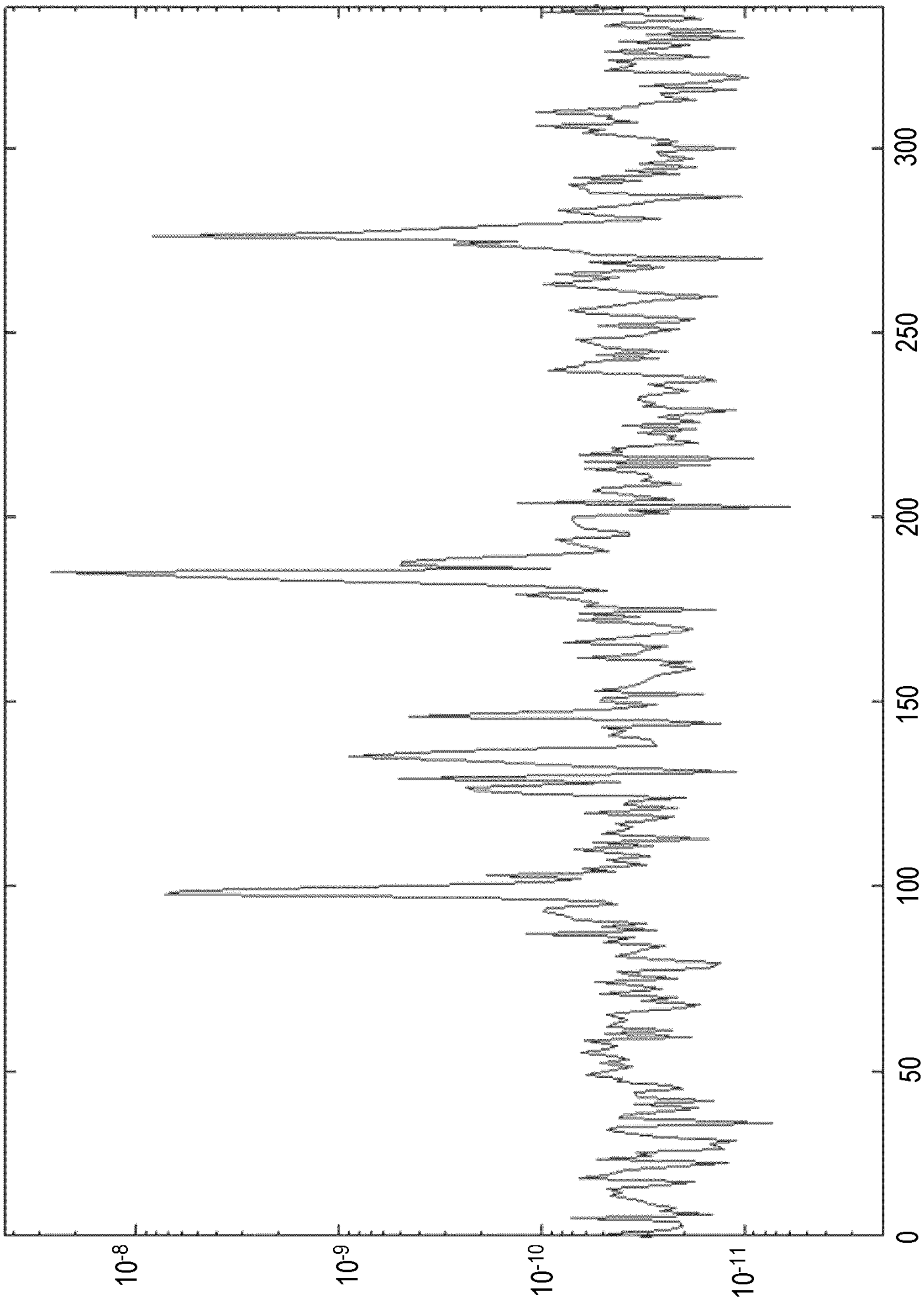
FIG. 7 shows another example of threshold determination for the power delay profile of FIG. 4 according to exemplary embodiments of the solution presented herein.

In another exemplary embodiment, the threshold condition comprises a delay dependent threshold condition relative to multiple peaks. According to this exemplary embodiment, a candidate peak is detected as a peak if (in linear scale) the following threshold condition is satisfied:

$$P_{candidtae\_peak} > R \cdot \max_k (f(\tau_k) \cdot P_k)$$

where $\tau_k$ represents the difference in time between peak k and the candidate peak, and where k=1 represents the dominant peak. Here, the peak search is done in an iterative way, where $P_1$ represents the strength of the dominant peak detected within the search window. If N peaks have been detected, then peak N+1 represents the strongest peak that is earlier than the N detected peaks and fulfills the threshold condition:

$$P_{candidtae\_peak\_N+1} > R \cdot \max_{k \in (1,2,\ldots,N)} (f(\tau_k) \cdot P_k)$$

where $\tau_k$ represents the difference in time between peak k and the N+1 candidate peak. When no more peaks can be detected fulfilling the iterative criteria, the last detected peak is used as the "first" peak for the TOA measurement. FIG. 6 provides an example of this embodiment by showing the use of delay-dependent thresholds relative to multiple peaks. FIG. 7 shows an example power delay profile zoomed in on the first peaks. In this example, there are multiple peaks before the strongest peak, which makes the use of delay dependent thresholds relative to multiple peaks relevant.

The signaled parameter(s) or the parameter(s) to be determine by the UE according to the rules described herein are R, $f$, or any parameter(s) used to derive R, $f$, or the combination R·$f$( . . . ). From the UE's perspective, the TOA estimation can then be done, e.g., as follows:

- The UE is configured over LPP with a number of DL PRSs including parameters defining a search window (e.g., as defined for NR in Rel. 16) and parameters defining the threshold (unless preconfigured).
- The UE is configured over LPP to perform RSTD and/or UE Rx-Tx time difference measurements based on the configured DL PRSs.
- For each DL PRS, the UE estimates the CIR within the search window.
- The UE identifies the strongest peak in the CIR power delay profile within the search window as the dominant peak.
- The UE estimates the strength $P_{dom\_peak}$ of the identified dominant peak in the CIR power delay profile within the search window.
- The UE iteratively searches for earlier peaks in the CIR fulfilling the iterative criteria $$P_{candidtae\_peak\_N+1} > R \cdot \max_{k\in(1,2,\ldots,N)} (f(\tau_k) \cdot P_k)$$

until no more such peaks can be identified.

- The UE reports RSTD and/or UE Rx-Tx time difference measurements based on the identified first peak in the CIR power delay profile within the search window as identified through the iterative peak search.

In one alternative of the delay dependent threshold condition relative to multiple peaks embodiment, the threshold condition for the iterative search may instead be represented by:

$$P_{candidate\_peak\_N+1} > R \cdot f(\tau_N) \cdot P_N$$

Depending on the form of the function $f$, this threshold condition may be mathematically equivalent to the original form.

In yet another alternative embodiment of the delay dependent threshold condition relative to multiple peaks embodiment, the threshold condition for the iterative search may instead be represented by:

$$P_{candidtae\_peak\_N+1} > R \cdot \max_{k\in 1,2,\ldots,N} f(\tau_k) \cdot P_k.$$

Using delay dependent thresholds to multiple peaks is useful to reject side peaks, not only of the strongest peak but also of other peaks.

It will be appreciated that the embodiment for delay dependent threshold conditions relative to multiple peaks may be combined with a delay independent threshold, e.g., as described above. This can be useful because, to some extent, they serve different purposes. A delay dependent threshold relative to multiple peaks may also be combined with a threshold relative to an estimated noise level as described further herein below.

According to another exemplary embodiment, the threshold condition may be configured in the case of multiple reference signal configurations. The threshold or parameter (s) can be explicitly signaled or determined by the UE based on the described rules per PRS, per TRP, or per frequency, or can apply for more than one PRSs, TRPs, or frequencies within one or more frequency bands. If the same threshold condition or the parameter(s) cannot be used for all or multiple PRS configurations, the explicit signaling of each threshold and/or threshold condition or set of parameter(s) will require a lot overhead.

In another example, a reference threshold condition or corresponding parameter(s) determining R, $f$, or any parameter(s) used to derive R, $f$, or the combination R·$f$( . . . ) is determined (signaled, pre-defined, or defined/calculated based on the described rules) for a reference PRS configuration. Then, if another configuration of PRS to be received by the UE differs from the reference PRS configuration, the reference threshold condition or corresponding parameter(s) are adapted accordingly. For example, a scaling or a compensation factors (which can be signaled or pre-defined) can be applied to adapt to a difference (with respect to the reference configuration) in one or more of:

- Number of PRS symbols, comb configuration, comb size, PRS density in frequency and/or time, PRS bandwidth, number of repetitions within a PRS period, etc. (the more PRS resource elements are available the more accurate the measurement is expected to be and therefore the smaller threshold with respect to the strongest peak can be used)
- PRS search window size (e.g., a smaller search window can motivate a larger threshold)
- Environment type or radio channel characteristics or propagation conditions or expected number of candidate peaks (e.g., the more unstable or fading is the channel or radio environment, the larger threshold may be needed or the more peaks is expected the smaller threshold can be used).

In fact, one or more scaling or compensation factors may be used, e.g., $R=R_{ref}$·k1·k2 . . . . , where $R_{ref}$ represents the R parameter for a reference PRS configuration and reference search window configuration or measurement uncertainty, k1 represents a scaling factor to adapt to the difference in the PRS density, comb, bandwidth, etc. (such scaling may be defined in a table as a function of these parameters), k2 represents a scaling factor to adapt to the difference in the search window configuration or measurement uncertainty, k3 represents a scaling factor to adapt to the radio environment, etc.

According to another exemplary embodiment, the threshold condition may be configured in the case of PRS bundling over multiple frequency layers. In NR Rel-16, up to four frequency layers can be configured to a UE in which the UE can receive DL PRS. Within a frequency layer, up to 272 PRBs are possible. However, in some scenarios demanding very stringent TOA estimation accuracy, it may be beneficial if the UE can receive DL PRSs from multiple frequency layers which can be coherently and jointly processed. This yields an increased DL PRS bandwidth which can help meet the stringent TOA accuracy requirements. Note that coherent and joint processing of DL PRSs from multiple frequency layers is not supported in NR Rel-16.

In one exemplary embodiment, one relative peak threshold condition may be configured for the DL PRSs from multiple frequency layers that are configured to be coherently and jointly processed at the UE. For example, when a UE receives DL PRS from a TRP in two different frequency layers, the UE may be configured to use a single relative peak threshold condition to identify the first peak in the CIR. The TOA estimation procedure from UE perspective may be similar to those given in for the delay independent or delay dependent embodiments discussed herein, with the exception that the UE may coherently and jointly process DL PRSs received from different frequency layers from the same TRP. In some cases, the number of frequency layers for receiving DL PRSs can be different for different TRPs. Hence, in these cases, the number of frequency layers over which DL PRSs can be coherently and jointly processed can be different for different TRPs. In other words, different levels of PRS aggregation over frequency layers is possible at different TRPs. Consider an example where TRP 1 has DL PRS configured in four frequency layers, TRP 2 has DL PRS configured in three frequency layers, TRP 3 has DL PRS configured in two frequency layers, and TRP 4 has DL PRS configured in one frequency layer. In this case, as different levels of PRS coherent/joint processing are possible at the four TRPS, four different relative peak threshold conditions may be configured to the UE. The UE uses the four different relative peak threshold conditions as follows:

- For TRP1, a first relative peak threshold condition is used by the UE for first peak identification in the CIR while the DL PRSs from four frequency layers are being coherently/jointly processed.
- For TRP2, a second relative peak threshold condition is used by the UE for first peak identification in the CIR while the DL PRSs from three frequency layers are being coherently/jointly processed.
- For TRP3, a third relative peak threshold condition is used by the UE for first peak identification in the CIR while the DL PRSs from two frequency layers are being coherently/jointly processed.
- For TRP4, a fourth relative peak threshold condition is used by the UE for first peak identification in the CIR while the DL PRSs from one frequency layer is being processed. Note that the use of different relative peak threshold conditions in this embodiment are motivated as the measurement accuracy improves with the coherent/joint processing of DL PRSs from more frequency layers. That is, a smaller relative peak threshold may be used when DL PRSs from four frequency layers are being jointly processed when compared to the case of DL PRS from one frequency layer is being processed.

The solution presented herein repeatedly relies on a "strength" of a peak of the CIR within the search window. The peak strength may be defined in several different ways in different alternative embodiments. The following lists multiple ways to define the peak strength. It will be appreciated that the solution presented herein is not limited to the listed techniques for determining the peak strength.

1. The peak strength is defined as the peak value in the power delay profile of the estimated CIR at the given sampling frequency.
2. The peak strength is defined as the peak value in the power delay profile of the estimated CIR after interpolation between the samples.
3. The peak strength is defined after extrapolation.
4. The peak strength is defined as the power delay profile of the estimated CIR integrated over a certain small time period around the detected peak.
5. The peak strength is defined as the power delay profile of the estimated CIR summed or averaged (linearly or non-linearly) over a certain number of samples around the detected peak.

The power delay profile of the CIR may be defined as the absolute square of the CIR. Alternatively the peak strength could be defined based on the absolute value of the CIR rather than based on the absolute square of the CIR.

Note that the estimation of the CIR may be performed in many different ways e.g. in the time domain through cyclic correlation with the known transmitted signal or in the frequency domain, e.g., through the following steps:

- FFT to frequency domain;
- Multiply each subcarrier symbol with the complex conjugate of the corresponding subcarrier symbol of the known transmitted signal;
  - If the known transmitted signal is not constant amplitude in the frequency domain one also needs to divide by the amplitude of the known signal for each subcarrier.
- IFFT back to time domain.

The CIR may also be estimated through a non-cyclic correlation with the known transmitted signal, which gives approximately the same result as a cyclic correlation for delays that are small relative to the symbol length.

In some exemplary embodiments, the above-described threshold conditions may further consider an absolute peak threshold, e.g., relative to an estimated noise and/or interference level. As such, the solution presented herein would only consider those peaks that also exceed the absolute peak threshold, e.g., as shown in FIG. 5 or 6.

More particularly, the relative peak detection threshold may be combined with an absolute threshold A. A candidate peak would then need to both exceed the absolute threshold and fulfill the threshold condition, e.g., exceed the delay independent threshold.

An absolute threshold may also be combined with a delay dependent threshold condition, in which case the requirement for the iterative peak search would be:

$$P_{candidtae\_peak\_N+1} > R \cdot \max_{k \in (1,2, \ldots ,N)} (f(\tau_k) \cdot P_k)$$

and $$P_{candidtae\_peak\_N+1} > A \equiv 10^{absolute\_threshold\_value/10}$$

The absolute threshold value could be given relative to the estimated noise and interference level, e.g. as the absolute_threshold_value=noise_and_interference_gap+estimated noise_and_interference in logarithmic scale, or as $A=R_{aks}\cdot\sigma^2$ in linear scale. The 'noise_and_interference_gap' could be preconfigured or signaled, e.g., over LPP to the UE. The noise_and_interference power can be estimated in a multitude of ways. For example, the noise_and_interference power σ may be estimated from the time-domain cross-correlation (complex vector C) as:

$$\sigma = \mathrm{MADN}([ReC;ImC]) \cdot \sqrt{2}$$

where the MADN is the median absolute deviation for the normal distribution, i.e., MADN (x)=median (|x−median (x)|)/0.675 for a vector X, where the minus is taken element-wise.

A Power Delay Profile (PDP) of a single symbol is the element-wise absolute square of the vector C. If C only contains noise, the PDP distribution (normalized by) is then Chi-square with 2 degrees of freedom (DOF). Assuming a PDP of n samples, the probability that all n noise samples are below an absolute threshold s is given as:

$$P(0 \le PDP(t) \le s, \forall t=1, \ldots n) = (1-e^{(-s/\sigma^2)})^n$$

Thus, the threshold s may be expressed in terms of a pre-defined noise probability P as:

$$s = -\sigma^2 \ln\left(1 - \sqrt[n]{P}\right)$$

The 'noise_and_interference_gap' can thus be written in linear scale as:

$$R_{abs} = -\ln(1 - n\sqrt{P})$$

In case, a search window is used, n should be the number of samples within the search window so that P is the probability not to detect any noise peaks above the threshold within the search window. Note that the relation to the probability P is strictly only valid for gaussian noise. It may, however, very well be a good approximation also for noise like interference.

As an alternative to signaling $R_{abs}$ in linear or logarithmic scale to the UE, the probability P could be signaled. The UE would then use the formula above to calculate the 'noise-_and_interference_gap'.

The absolute threshold may be combined with the relative threshold in an alternative way as follows. Define the set S of real-valued sample times (representing interpolated PDP values) as a union of open intervals where the threshold is satisfied at samples t=1, . . . ,n as:

$$S = \bigcup_{PDP(t) \vdots > + \vdots s} (t - 1, t + 1)$$

And then we find the earliest peak in S that also satisfies the relative peak criteria.

According to some exemplary embodiments, the absolute peak threshold may be determined from several PDPs. If we have access to several PDPs, we may do a peak search on the sum of these PDPs. In this way, we may update old results when new ones are available. We may also update the estimated noise scale σ, e.g., by stacking all PDP vectors and taking the MADN.

For example, assume that sPDP(t) represents the sum of k PDPs, e.g., PDP1(t)+ . . . +PDPk(t). If all PDPs are noise (the underlying cross-correlations are complex Gaussian with standard deviation σ), then sPDP(t) is given by Erlang (k,1/$\sigma^2$), which means that the threshold s may be calculated from:

$$P(0 \le PDP(t) \le s, \forall\, t = 1, \ldots, n) = \left(1 - e^{(-s/\sigma^2)} f_k(s/\sigma^2)\right)^n$$

where $$f_k(x) = \sum_{j=0}^{k-1} \frac{x^j}{j!}$$

In this case, s may have to be determined numerically from a pre-defined noise probability P.

According to additional or alternative exemplary embodiments, the absolute peak threshold may be determined from approximate probabilities. If the probability calculations result in large numerical rounding errors, we may use the approximation:

$$P(0 \le PDP(t) \le s, \forall t = 1, \ldots, n) = 1 - n \cdot e^{(-s/\sigma^2)} fk(s/\sigma^2)$$

which is tight for large P and s. Similarly, for the Chi-square case, the following approximation may be used:

$$P(0 \le PDP(t) \le s, \forall t = 1, \ldots, n) \ge 1 - n \cdot e^{(-s/\sigma^2)}$$

Additional exemplary embodiments couple the threshold condition with an integrity assessment. As mentioned herein, there may be many techniques to configure the CIR peak threshold or evaluate the CIR for an accurate TOA estimation. These techniques may have different complexity and accuracy. Providing reporting support on choice of this technique and the chosen threshold for the node (i.e., either the UE or the network node) that has done the TOA estimation is an important parameter for the other node (i.e. the network node or the UE) to evaluate the quality of the TOA estimation. It can be also beneficial to couple this threshold choice to the integrity level that the other node can assume for the positioning estimation.

In one exemplary coupling scenario, the threshold condition can be reported as a positioning integrity KPI, which can assist in evaluating the quality of the TOA estimation.

In another exemplary coupling scenario, together with this CIR threshold condition signaling, additional data can be transferred with a certain format that indicates the positioning integrity level of the chosen threshold. The format of this data may comprises, for example:

- A predefined integer value
- A predefined integrity level indication (e.g. high, medium, low)
- An integrity capability option, of whether the device was able to assess the integrity level of this threshold or not (e.g. a binary value or a YES/NO indication).

According to yet another exemplary embodiment, the UE may be configured to transmit information about all or subset of candidate peaks in the CIR detected by the UE within the search window, and which meet one or more threshold condition criteria described herein. The criteria is associated with a threshold which depends on signal level, relative delay between strongest and candidate peaks, etc. The information about the candidate peaks may comprise one or more of:

- number of detected candidate peaks;
- signal level (e.g., power, CIR, etc.) of each candidate peak compared to a certain threshold (e.g., reference signal level such as signal level strongest peak, first detected peak, etc.);
- relative time of reception of each candidate within the search window compared to a certain threshold (e.g., reference time such as time of strongest peak, first detected peak, etc.).

For example, assume that within the search window the UE detects a strongest peak whose signal level (e.g., CIR, signal strength, Signal-to-Interference plus Noise Ratio (SINR), etc.) is denoted by $P_{dom\_peak}$, The UE further detects (L−1) additional candidate peaks whose signal level (e.g., CIR, signal strength, SINR, etc.) is greater than ($P_{dom\_peak}$−H), where H represents a signal level threshold, and where as an example both $P_{dom\_peak}$ and H are expressed in logarithmic scale. In yet another embodiment, H may further depend on the timing information, e.g., on the relative time difference between the reception time of the strongest (dominant) peak and a reference time etc. In this example, the UE may detect L candidate peaks of the received signal from a node (e.g., cell, TRP, etc.) whose signals (e.g., PRS) is measured by the UE.

In one example, the UE can be configured based on a pre-defined rule and/or based on a received request from the network node (e.g., LMF) to transmit information (as described above) about the detected candidate peaks which meet the threshold condition criteria (as described above) to the network node.

In another example, the UE can be configured based on a pre-defined rule and/or based on the received request from the network node (e.g., LMF) to transmit information about the detected candidate peaks which meet the criteria (as described above) to the network node depending on number (M) of the detected candidate peaks, where M can be configured by the network node or pre-defined. This is further explained with few examples below:

1. In one example, the UE is configured to transmit the information only if the criteria are met for more than M number of candidate peaks, e.g., M=2, i.e., at least M candidate peaks meeting the criteria are detected.
2. In another example, the UE is configured to transmit the information only if the criteria are met for less than M number of candidate peaks, e.g., M=2, i.e., at least M candidate peaks meeting the criteria are detected.
3. In yet another example, the UE is configured to transmit the information only if the criteria are met for specific number, M, of candidate peaks, e.g., M=2, i.e., only if M candidate peaks meeting the criteria are detected.
4. In yet another example, the UE is configured to transmit the information only if the criteria are met for any number, M, of candidate peaks within certain range between M1 candidate peaks and M2 candidate peaks, e.g., transmit information if a condition (M1≤M≤M2) is met, e.g., M1=2 and M2=6.

In one example, the UE transmits the information about the candidate peaks in any of the above example along with the measurement results such as with RSTD, UE Rx-Tx time difference, multi-RTT measurement reports.

In another example, the UE transmits the information about the candidate peaks in any of the above example whenever the candidate peaks are detected.

In another example, the UE transmits the information about the candidate peaks in any of the above example not more than P number of times within the positioning session. As special case P=1.

The network node (e.g., LMF, base station, etc.) may use the received information about the candidate peaks from one or more UEs for one or more tasks. For example, the network node may use results from one UE or statistics from multiple UEs (to enhance reliability) for one or more tasks in certain geographical region or radio environment. Exemplary tasks include, but are not limited to, adapting the values of one or more parameters associated with positioning procedure and/or transmitting the received information to another node (e.g., to the BS, to another LMF, etc.). Examples of parameters associated with positioning procedure are those used by the UE for candidate peak detection. Examples of such parameters (associated with candidate peak detection include, but are not limited to, duration of the search window, signal threshold, etc. For example, if the number of candidate peaks detected by the UE is above certain threshold then the network node may increase the signal threshold (e.g., H) with respect to certain reference value; otherwise it may decrease the signal threshold with respect to the reference value. In another example, if the number of candidate peaks detected by the UE is above certain threshold then the network node may increase the duration of the search window with respect to certain reference value; otherwise it may decrease the duration of the search window with respect to the reference value. In the future, the network node may use the adapted parameters for configuring the UEs operating in a location and/or in a propagation environment similar to those in which the information about the candidate peaks was obtained by the network node.

Exemplary embodiments of the solution presented herein also consider signaling aspects associated with the disclosed threshold conditions. The peak detection threshold or parameter determining R, $f(\ldots)$, or the combination $R\cdot f(\ldots)$ could be signaled, e.g., in the DL PRS assistance data as shown in the ASN.1 example implementation below. In one example, the range of the threshold is the same as for differential PRS-RSRP measurement reporting.

In this ASN.1 example, the peak detection threshold is located in the IE NR-DL—PRS-PositioningFrequency-Layer-r16. It could alternatively be located higher up in the hierarchical ASN.1 structure, e.g., in the IE NR-DL-PRS-AssistanceData-r16 or NR-DL-PRS-AssistanceDataPer-Freq-r16 or NR-DL-PRS-AssistanceDataPerTRP-r16 at the cost of somewhat reduced flexibility.

```
-- ASN1START
NR-DL-PRS-AssistanceData-r16 ::= SEQUENCE {
  nr-DL-PRS-ReferenceInfo-r16 DL-PRS-IdInfo-r16 OPTIONAL,    -- Need ON
  nr-DL-PRS-AssistanceDataList-r16 SEQUENCE (SIZE (1..nrMaxFreqLayers)) OF NR-DL-
PRS-AssistanceDataPerFreq-r16,
  nr-SSB-Config-r16   SEQUENCE (SIZE (0..255)) OF NR-SSB-Config-r16,
  ...
}
NR-DL-PRS-AssistanceDataPerFreq-r16 ::= SEQUENCE {
  nr-DL-PRS-AssistanceDataPerFreq (SIZE (1..nrMaxTRPsPerFreq)) OF NR-DL-PRS-
AssistanceDataPerTRP-r16,
  nr-DL-PRS-PositioningFrequencyLayer-r16 NR-DL-PRS-PositioningFrequencyLayer-r16
  OPTIONAL,
  --Need ON
  ...
}
NR-DL-PRS-AssistanceDataPerTRP-r16 ::= SEQUENCE {
  nr-DL-PRS-expectedRSTD-r16                  INTEGER (-3841..3841),
  nr-DL-PRS-expectedRSTD-uncerainty-r16       INTEGER (-246..246),
  trp-ID-r16                                  TRP-ID-r16   OPTIONAL,
  nr-DL-PRS-Config-r16                        NR-DL-PRS-Config-r16,
  ...
```

-continued

```
}
NR-DL-PRS-PositioningFrequencyLayer-r16 ::= SEQUENCE {
  dl-PRS-SubcarrierSpacing-r16        ENUMERATED {kHz15, kHz30, kHz60, KHz120, ...},
  dl-PRS-ResourceBandwidth-r16        INTEGER (1..63),
  dl-PRS-StartPRB-r16                 INTEGER(0..2176),
  dl-PRS-PointA-r16                   ARFCN-ValueNR-r15,
  dl-PRS-CombSizeN-r16                ENUMERATED {n2, n4, n6, n12, ...},
  dl-PRS-CyclicPrefix-r16             ENUMERATED {normal, extended, ...},
  ... ,
  [[
  nr-DL-PRS-threshold-r17    INTEGER (0..31)
  ]]
}
nrMaxFreqLayers   INTEGER ::= 4         -- Max freq layers
nrMaxTRPsPerFreq   INTEGER ::= 64                  -- Max TRPs per freq layers
nrMaxResourceIDs INTEGER ::= 64         -- Max ResourceIDs
-- ASN1STOP
```

| NR-DL-PRS-AssistanceData field descriptions |
|---|
| nr-DL-PRS-Config |
| This field specifies the PRS configuration of the TRP. |
| nr-DL-PRS-ReferenceInfo |
| This field indicates the IDs of the reference TRP. |
| nr-DL-PRS-ResourceID-List |
| The list of nr-DL PRS resource ID. Only a single nr-DL-PRS-ResourceId is included if the field is used in measurement reporting. |
| nr-DL-PRS-threshold-r17 |
| Path detection threshold in dB relative to the strongest path in the channel impulse response. |

Exemplary embodiments of the solution presented herein also consider methods for updating a threshold condition. Determining and/or signaling of a new peak detection threshold condition, or a parameter determining R, $f(\ldots)$, or the combination $R \cdot f(\ldots)$, can be triggered by, e.g., one or more of:

- A request, an indication, message, or a signal measurement from the UE indicative of the need for a new peak detection threshold,
- Signaling new assistance data and/or new measurement configuration,
- The number of candidate peaks (e.g., when it is above a corresponding threshold, then the peak detection threshold can be reduced, otherwise if no or too few peaks are detectable the peak detection threshold can be increased),
- If the strongest peak has changed over a time span or compared to its pervious value by more than another threshold $\Delta$(e.g., $\Delta=0$ in a special case or $\Delta>0$), the UE may send an indication to the network node,
- Measured signal reconfiguration (e.g., when a PRS configuration parameter which determines the peak detection threshold or parameters R or $f(\ldots)$ has changed such as the number of PRS symbols, comb configuration, comb size, PRS density in frequency and/or time, PRS bandwidth, number of repetitions within a PRS period, etc.,
- PRS search window size (e.g., a smaller search window can motivate a larger threshold) has changed, and
- Environment type or radio channel characteristics or propagation conditions or expected number of candidate peaks has changed.

In another exemplary embodiment, there may be no need to signal the updated peak detection threshold, R or $f(. .)$, rather than the UE is able, based on pre-defined rule to update the peak detection threshold autonomously, e.g., a PRS BW change by a factor k_BW can trigger the update in the peak detection threshold where the update depends on k_BW Additional embodiments may consider DL PRs(s) that are non-homogenous in frequency. In NR Rel. 16, the DL PRS was designed to always be homogenous in frequency, i.e., counting over all DL PRS symbols within a slot, each subcarrier within the PRBs used for DL PRS transmission is utilized the same number of times. This is captured by the CR to 38.211 in R1-2005123 by allowing only DL PRS sizes in number of symbols that are a multiple of the comb size, in combination with the relative frequency offset k' in table 7.4.1.7.3-1 in 38.211, relevant extracts of each of which are provided below.

start extract from the CR to 38.211 in R1-2005123 the size of the downlink PRS resource in the time domain $L_{PPS} \in \{2,4,6,12\}$ is given by the higher-layer parameter dl-PRS-NumSymbols-r16;

the comb size $$K_{comb}^{PRS} \in \{2, 4, 6, 12\}$$

is given by the higher-layer parameter dl-PRS-CombSizeN-r16 such that the combination $$\{L_{PRS}, K_{comb}^{PRS}\}$$

is one of {2, 2},{4, 2}, {6, 2}, {12, 2}, {4, 4}, {12, 4}, {6, 6}, {12, 6}, and {12, 12};

end extract from the CR to 38.211 in R1-2005123 start table extract from the CR to 38.211 in R1-2005123

TABLE 7.4.1.7.3-1

The frequency offset $k'$ as a function of $l - l_{start}^{PRS}$.

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

end table extract from the CR to 38.211 in R1-2005123

Homogeneity in frequency ensures that issues with side peaks are avoided. However, utilizing a relative peak strength threshold, side peaks issues can be controlled and thus the restriction to DL PRS patterns that are homogenous in frequency can be lifted. The restriction to certain combinations of comb sizes and time domain size of the DL PRS can be removed and one can also allow single symbol DL PRS. Such a change could be captured in 38.211, e.g., by the following change (bolded for emphasis):

example modification to 38.211 the size of the downlink PRS resource in the time domain $L_{PRS} \in \{2,4,6,12\}$ is given by the higher-layer parameter dl-PRS-NumSymbols-r16;

the comb size $$K_{comb}^{PRS} \in \{2, 4, 6, 12\}$$

is given by the higher-layer parameter dl-PRS-CombSizeN-r16 end example modification to 38.211

In another example, the restriction to certain combinations of comb sizes and time domain size of DL PRS as specified in NR Rel-16 can be removed depending on one or more higher layer parameters configured by the network to the UE, e.g., via LPP. This higher layer parameter may be an explicit configuration parameter for removing this restriction. In another example, this higher layer parameter may include the configuration of a peak detection threshold as covered in the embodiments above. The corresponding modification to 3GPP TS 38.211 is bolded below for emphasis, where the higher layer parameter is denoted as 'parameterx':

example modification to 38.211

If higher layer parameter parameterx is configured, the size of the downlink PRS resource in the time domain $L_{PRS} \in \{2,4,6,12\}$ is given by the higher-layer parameter dl-PRS-NumSymbols-r16;

the comb size $$K_{comb}^{PRS} \in \{2, 4, 6, 12\}$$

is given by the higher-layer parameter dl-PRS-CombSizeN-r16;

Otherwise, the size of the downlink PRS resource in the time domain $L_{PRS} \in \{2,4,6,12\}$ is given by the higher-layer parameter dl-PRS-NumSymbols-r16;

the comb size $$K_{comb}^{PRS} \in \{2, 4, 6, 12\}$$

is given by the higher-layer parameter dl-PRS-CombSizeN-r16 such that the combination $$\{L_{PRS}, K_{comb}^{PRS}\}$$

is one of {2, 2},{4, 2}, {6, 2}, {12, 2}, {4, 4}, {12, 4}, {6, 6}, {12, 6}, and {12, 12};

end example modification to 38.211

In another exemplary embodiment, one could alternatively add additional allowed combinations rather than remove the limitation completely, e.g., as in the following example where single symbol comb-6 and comb-12 signals are allowed in addition to the already allowed combinations (changes bolded for emphasis):

example modification to 38.211 the size of the downlink PRS resource in the time domain $L_{pRs} \in \{2,4,6,12\}$ is given by the higher-layer parameter dl-PRS-NumSymbols-r16;

the comb size $$K_{comb}^{PRS} \in \{1, 2, 4, 6, 12\}$$

is given by the higher-layer parameter dl-PRS-CombSizeN-r16 such that the combination $$\{L_{PRS}, K_{comb}^{PRS}\}$$

is one of {2, 2},{4, 2}, {6, 2}, {12, 2}, {4, 4}, {12, 4}, {1, 6}, {6, 6}, {12, 6}, {1, 12}, and {12, 12};

end example modification to 38.211

To allow single symbol DL PRS would also require a signaling change in 37.355, e.g., as in the example modification below in 37.355 (example based on v16.0.0)

```
-- ASN1START
NR-DL-PRS-Config-r16 ::= SEQUENCE {
  nr-DL-PRS-ResourceSetList-r16         SEQUENCE (SIZE (1..nrMaxSetsPerTRP)) NR-DL-
PRS-ResourceSet-r16,
  nr-DL-PRS-SFNO-Offset-r16 SEQUENCE {
    sfn-Offset-r16                      INTEGER (0..1023),
    integerSubframeOffset-r16           INTEGER (0..9) OPTIONAL -- Need OP
  } OPTIONAL,
  ...
}
NR-DL-PRS-ResourceSet-r16 ::= SEQUENCE {
  nr-DL-PRS-ResourceSetId-r16                        NR-DL-PRS-ResourceSetId-r16,
  dl-PRS-Periodicity-and-ResourceSetSlotOffset-r16-r16      NR-DL-PRS-Periodicity-and-
ResourceSetSlotOffset-r16,
  dl-PRS-ResourceRepetitionFactor-r16        ENUMERATED {n1, n2, n4, n6, n8, n16, n32, ...},
  dl-PRS-ResourceTimeGap-r16                 ENUMERATED {s1, s2, s4, s8, s16, s32, ...},
  dl-PRS-ResourceList-r16                    SEQUENCE (SIZE (1..nrMaxResourcesPerSet)) OF
NR-DL-PRS-Resource-r16,
  dl-PRS-NumSymbols-r16                      ENUMERATED {n2, n4, n6, n12, n1−v17xy, ...},
  dl-PRS-MutingPatternList-r16               SEQUENCE {
    mutingOption1-r16                                  SEQUENCE {
      mutingPattern-r16                                  MutingPattern-r16,
      dl-PRS-MutingBitRepetitionFactor-r16             ENUMERATED {n1, n2, n4, n8,
...}  OPTIONAL  -- Need OR
    },
    mutingOption2-r16                                  SEQUENCE {
      mutingPattern-r16                                  MutingPattern-r16
    }
  },
  dl-PRS-ResourcePower-r16                        INTEGER (−60..50),
  ...
}
```

This would allow the combination of a large comb-size with a short time domain size of the DL-PRS. In scenarios where coverage can be achieved with a short time domain size of the DL-PRS, e.g., indoor office or indoor factory scenarios, this reduces the positioning overhead significantly. As an example, a single symbol comb-12 signal allows for 12 orthogonal DL-PRS signals using a single OFDM symbol or 144 orthogonal DL-PRS signals utilizing 12 OFDM symbols. The Rel. 16 DL PRS requires at least 12 symbols to allow for 12 orthogonal DL-PRS signals.

Figure 8:
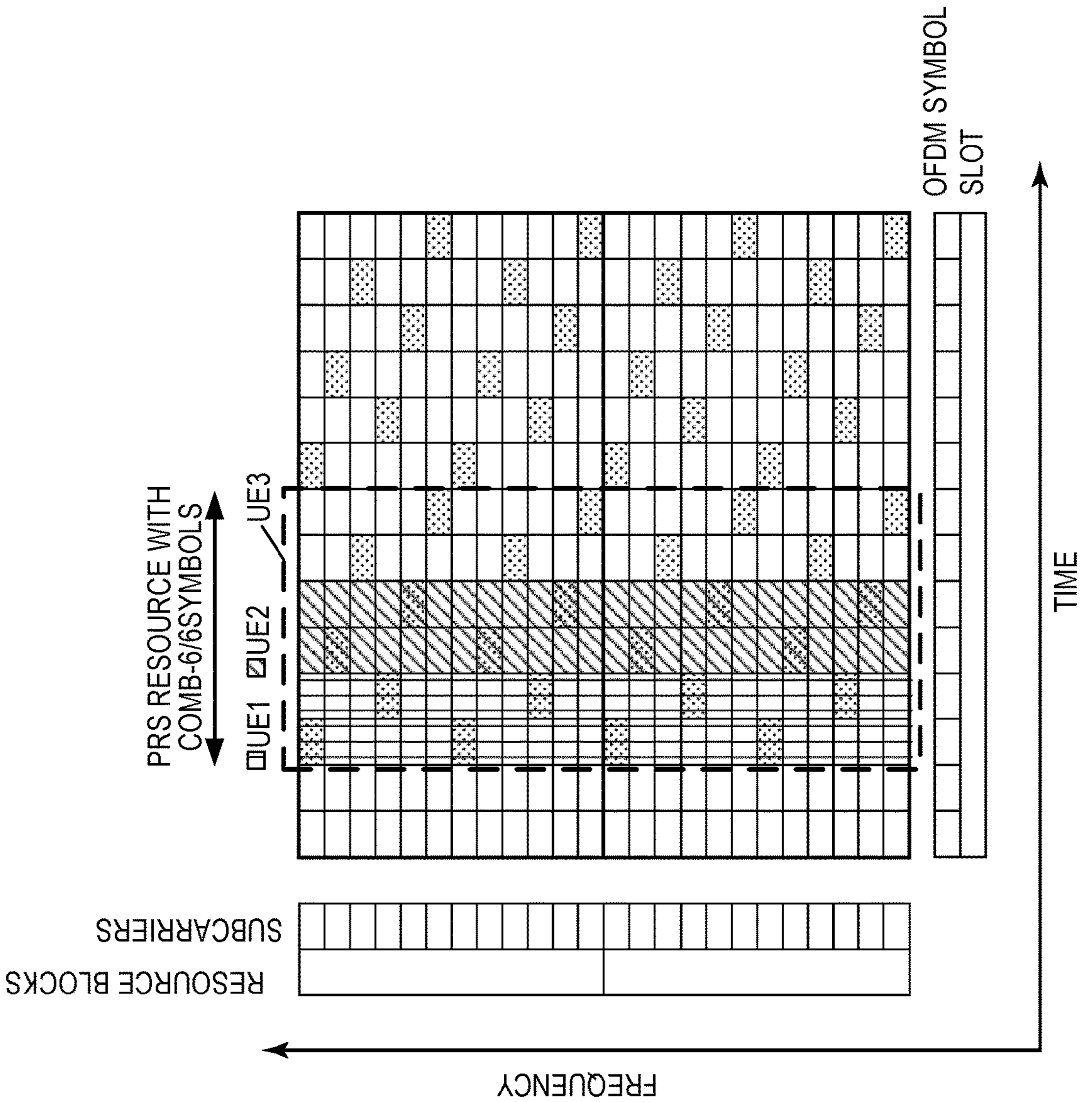
FIG. 8 shows exemplary PRS resources for multiple UEs applicable for the solution presented herein.

Another alternative example is that the UE may be configured with one of the {2, 2},{4, 2}, {6, 2}, {12, 2}, {4, 4}, {12, 4}, {6, 6}, {12, 6}, and {12, 12} combination, but to only measure on a subset of symbols of the PRS resource this could be realised with a LPP configuration of dl-PRS-NumSymbols-r16 coupled to an additional LPP higher layer parameter (e.g., dl-PRS-MeasNumSymbols-r16) signaling the symbols to be measured, the additional parameter dl-PRS-MeasNumSymbols-r16 could consist of a number X and mean that the X first number of symbol in the PRS resource should be considered for the measurement. Alternatively, dl-PRS-MeasNumSymbols-r16 could be signaling the starting symbol and the ending symbol over which the UE should measure, or a list of symbols from 1 to dl-PRS-NumSymbols-r16 (e.g. [1,5,7] to select the first, fifth and seventh symbol in the resource). This would enable multiple UEs to use the same PRS comb size, but to measure on shorter or longer period of time, depending on their needs, as shown in FIG. 8. Alternatively, the number of consecutive symbols to utilize for one TOA estimate could be limited in order to allow the UE to perform RX beam sweeping within one DL PRS slot.

If a UE is limited in capability to process PRS, the UE could report exactly which pairing of $$\{L_{PRS}, K_{comb}^{PRS}\}$$

among the allowed pairing is supported as part of the capability signalling.

Figure 9:
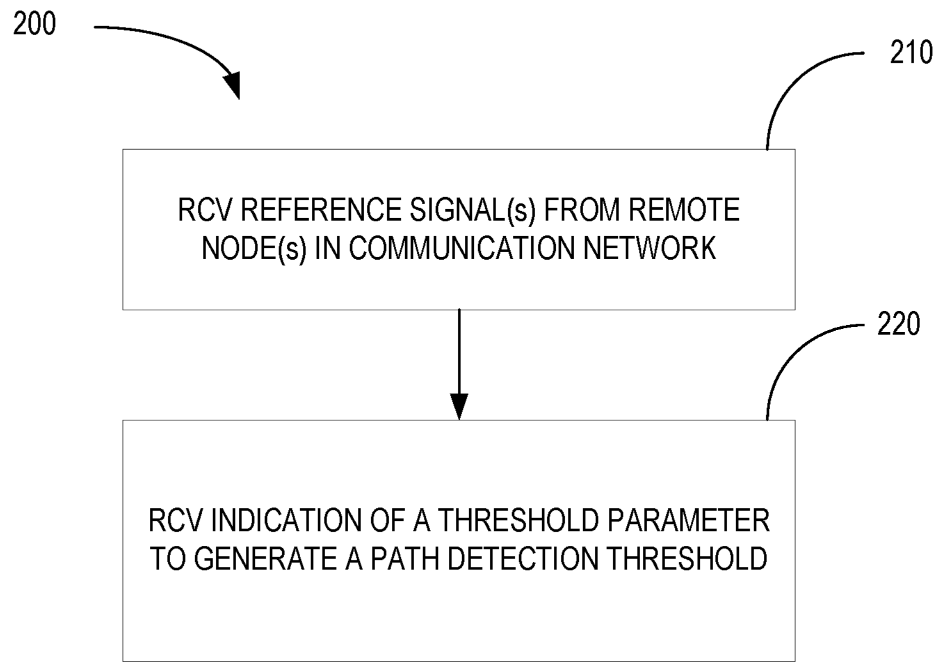
FIG. 9 shows another exemplary method according to embodiments of for the solution presented herein.

FIG. 9 shows another exemplary method 200 for the solution presented herein as implemented by a wireless device. The method comprises receiving a reference signal from a node within the communication network (block 210). The method further comprises receiving an indication of a threshold parameter representing an adjustment to be applied by the wireless device to a set of one or more paths of a CIR of the reference signal for generating a path detection threshold for detecting the first path in time of the CIR within a search window (block 220).

Figure 10:
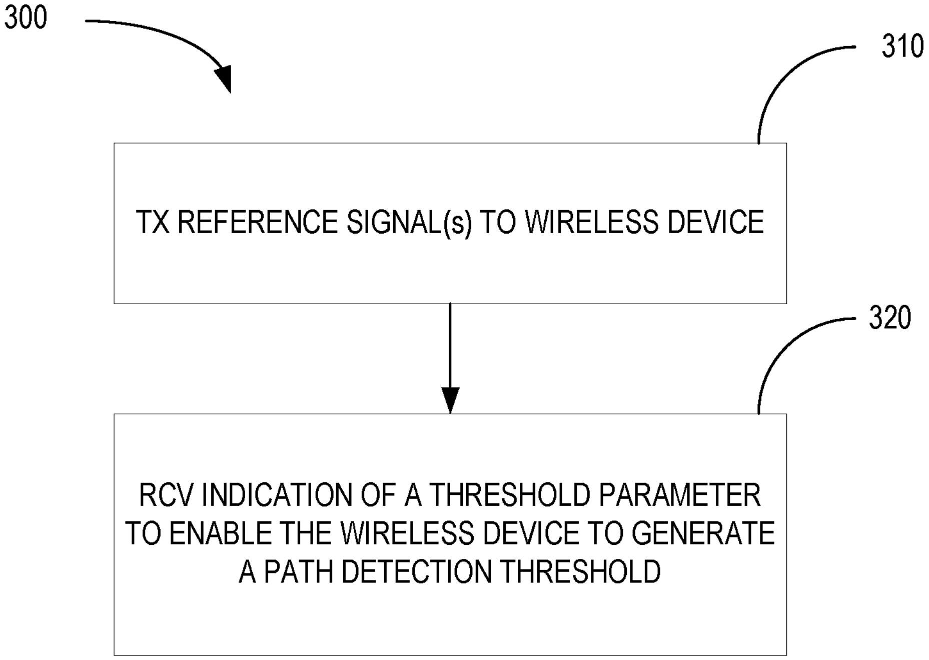
FIG. 10 shows another exemplary method according to embodiments of for the solution presented herein.

FIG. 10 shows another exemplary method 300 for the solution presented herein as implemented by a network node. The method comprises transmitting a reference signal to a wireless device within the communication network (block 310). The method further comprises transmitting an indication of a threshold parameter representing an adjustment to be applied by the wireless device to a set of one or more paths of a CIR of the reference signal for generating a path detection threshold for detecting the first path in time of the CIR within a search window (block 320).

Figure 11:
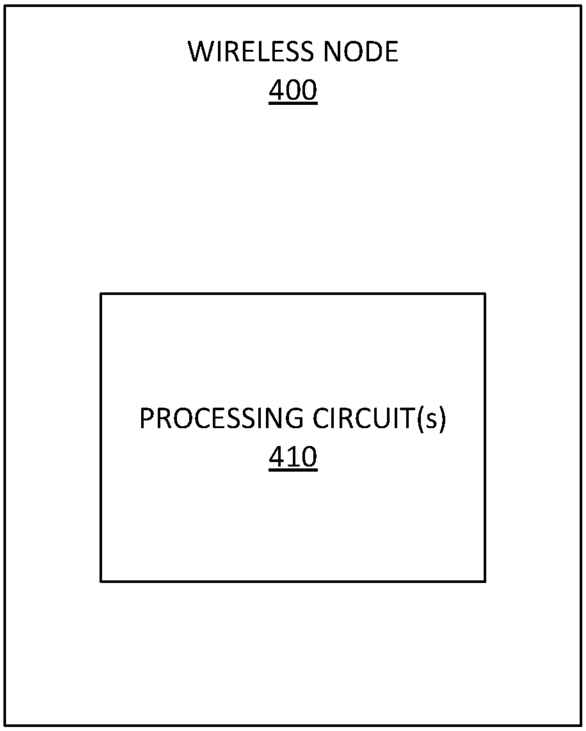
FIG. 11 shows a block diagram of an exemplary wireless node according to embodiments of for the solution presented herein.

FIG. 11 shows a block diagram for a wireless node 400 according to exemplary embodiments of the solution presented herein. The wireless node includes one or more processing circuits for executing the TOA method disclosed herein, e.g., method 100 in FIG. 3, method 200 of FIG. 9, method 300 of FIG. 10, etc. As used herein, a wireless node 400 includes any node within a wireless communication network, including but not limited to, a UE, base station (NB, eNB, gNB, etc.), or other network node, e.g., LM F. Exemplary processing circuits may include separate circuits for each step, e.g., a transceiver, a CIR processor, an identification circuit, and a TOA estimation circuit, etc. Additional processing circuits may include parameter and/or threshold determination circuits. Alternatively, one or more processing circuits may implement two or more steps of a method.

Note that the apparatuses described herein may perform the methods herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For example, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein. Thus, various apparatus elements disclosed herein may implement any functional means, modules, units, or circuitry, and may be embodied in hardware and/or in software (including firmware, resident software, microcode, etc.) executed on a controller or processor, including an application specific integrated circuit (ASIC).

The present invention may be embodied as cellular communication systems, methods, and/or computer program products. Accordingly, the present invention may be embodied in hardware and/or in software (including firmware, resident software, micro-code, etc.), including an application specific integrated circuit (ASIC). Furthermore, the present invention may take the form of a computer program product on a computer-usable or computer-readable storage medium having computer usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, or a portable compact disc read-only memory (CD-ROM). Note that the computer-usable or computer-readable medium could even be paper or another suitable medium upon which the program is printed, as the program can be electronically captured via, for example, optical scanning or the paper or other medium, then compiled, interpreted, or otherwise processed in a suitable manner, if necessary, and then stored in a computer memory.

The following provides exemplary implementations of the solution presented herein.

A first exemplary implementation is a flow chart from the perspective of the UE.

1) The UE signals it's capabilities over LPP to the location server, including the capability to perform peak detection utilizing a relative threshold and it's capability to support new DL PRS configurations that are non-homogenous in the frequency domain
2) The UE is configured by the location server over LPP
   a) With a number of PRS's that are non-homogenous in the frequency domain, each transmitted by a TRP
   b) Assistance data including relative threshold value for the TOA estimation peak search
   c) To perform and report RSTD measurement for a number of TRPs.
3) The UE performs the RSTD measurements using the relative threshold in the peak search for the TOA estimation and reports the measurement results to the location server.

Another exemplary implementation is from the perspective of the gNB.

1) The gNB provides DL PRS configuration details over NRPPa to the location server for the TRPs controlled by the gNB.
2) The gNB transmits a number of DL PRSs from the TRPs that the gNB controls.

Another exemplary implementation is from the perspective of the location server.

1) The location server receives DL PRS configuration details from a number of gNBs over NRPPa for the TRPs controlled by the gNBs.
2) The location server receives UE capabilities from a UE over LPP, the capability to perform peak detection utilizing a threshold and it's capability to support new DL PRS configurations that are non-homogenous in the frequency domain.
3) The location server configures the UE through signaling over LPP
   a) With a number of PRS's that are non-homogenous in the frequency domain, each transmitted by a TRP
   b) Assistance data including relative threshold value for the TOA estimation peak search
   c) To perform and report RSTD measurement for a number of TRPs.
4) The location server receives RSTD measurements over LPP from the UE for each TRP and UE antenna panel.
5) The location server estimates the position of the UE based on the RSTD measurements towards a number of TRPs RTT-positioning using CIR peak threshold Another exemplary implementation is from the perspective of the UE.

1) The UE signals it's capabilities over LPP to the location server, including the capability to perform peak detection utilizing a relative threshold and it's capability to support new DL PRS configurations that are non-homogenous in the frequency domain
2) The UE is configured over RRC by it's serving gNB with a number of SRS's
3) The UE is configured by the location server over LPP
   a) With a number of PRS's that are non-homogenous in the frequency domain, each transmitted by a TRP
   b) Assistance data including relative threshold value for the TOA estimation peak search
   c) To perform and report UE Rx-Tx Time difference measurements
4) The UE performs the UE Rx-Tx Time difference measurements using the relative threshold in the peak search for the TOA estimation and reports the measurement results to the location server.

5) The UE transmits the configured SRSs

Another exemplary implementation is from the perspective of the serving gNB.

1) The gNB provides DL PRS configuration details over NRPPa to the location server for the TRPs controlled by the gNB.
2) The serving gNB receives a request over NRPPa from the location server to configure a UE with a number of SRS's, including proposed SRS configurations.
3) The serving gNB signals an acknowledgement over NRPPa to the location server that a number of SRS's will be configured, including SRS configuration details.
4) The serving gNB configures the UE through signaling with a number of SRS's
5) The serving gNB receives a request over NRPPa from the location server to perform and report gNB Rx-Tx time difference measurements.
6) The serving gNB transmits a number of DL PRSs from the TRPs that the gNB controls.
7) The serving gNB receives an SRS transmitted by the UE and performs the gNB Rx-Tx time difference measurement
8) The serving gNB signals the gNB Rx-Tx time difference measurements over NRPPa to the location server.

Another exemplary implementation is from the perspective of the non-serving gNB.

1) The gNB provides DL PRS configuration details over NRPPa to the location server for the TRPs controlled by the gNB.
2) The gNB receives a request over NRPPa from the location server to perform and report gNB Rx-Tx time difference measurements. The request includes SRS configuration details to be used for the measurements.
3) The gNB transmits a number of DL PRSs from the TRPs that the gNB controls.
4) The gNB receives an SRS transmitted by the UE and performs the gNB Rx-Tx time difference measurement
5) The gNB signals the gNB Rx-Tx time difference measurements over NRPPa to the location server.

Another exemplary implementation is from the perspective of the location server.

1) The location server receives DL PRS configuration details from a number of gNBs over NRPPa for the TRPs controlled by the gNBs.
2) The location server receives UE capabilities from a UE over LPP, including the capability to perform peak detection utilizing a relative threshold and it's capability to support new DL PRS configurations that are non-homogenous in the frequency domain.
3) The location server sends a request to the serving gNB of the UE to configure the UE with a number of SRS's. The request include proposed SRS configurations.
4) The location server receives an acknowledgement from the serving gNB over NRPPa that a number of SRS's will be configured, including SRS configuration details.
5) The location server configures the UE through signaling over LPP
   a) With a number of PRS's that are non-homogenous in the frequency domain, each transmitted by a TRP
   b) Assistance data including relative threshold value for the TOA estimation peak search
   c) To perform and report UE Rx-Tx Time difference measurements
6) The location server receives gNB Rx-Tx time difference measurements over NRPPa from a number of gNBs.
7) The location server receives UE Rx-Tx time difference measurements over LPP from the UE.
8) The location server estimates the position of the UE based on the RTT measurements towards a number of TRPs utilizing that the RTT measurements corresponding to different UE antenna panels have different systematic errors.

Although the term "TRP" is used in this disclosure, this term may be represented by one or more identifiers in 3GPP specifications. For example, a TRP may be represented by 'dl-PRS-Id'. The reason is that the UE need not necessarily know which TRP a DL PRS is transmitted from, it just needs to know the configuration and ID/IDs related to the DL PRS and perform measurements based on that DL PRS.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended embodiments are intended to be embraced therein.

The invention claimed is:

1. A method of estimating a Time of Arrival, TOA, by a wireless node in a wireless communication network, the method comprising:

receiving one or more reference signals from one or more remote wireless nodes;

estimating a Channel Impulse Response, CIR, responsive to the received one or more reference signals;

identifying as a TOA peak a first peak of the CIR in time within a search window that satisfies a threshold condition, wherein the threshold condition is defined responsive to a strength of a dominant peak of the CIR within the search window;

estimating the TOA from the TOA peak; and coherently and jointly processing reference signals received via a plurality of frequency layers, wherein the estimating the CIR comprises estimating the CIR within the search window responsive to the coherently and jointly processed reference signals.

2. The method of claim 1, wherein the threshold condition is whether a candidate peak of the CIR within the search window exceeds a peak threshold defined responsive to the strength of the dominant peak.

3. The method of claim 2, wherein the peak threshold is defined responsive to the strength of the dominant peak and an adjustment value.

4. The method of claim 3, wherein the peak threshold is defined as the strength of the dominant peak reduced by the adjustment value.

5. The method of claim 3, comprising receiving the adjustment value from at least one of the one or more remote wireless nodes or from another node within the wireless communication network.

6. The method of claim 3, comprising determining the adjustment value responsive to one or more rules preconfigured for the wireless node.

7. The method of claim 6, wherein the one or more rules comprise one or more rules preconfigured per positioning reference signal, preconfigured per remote wireless node, and/or preconfigured per frequency.

8. The method of claim 3, wherein the adjustment value is determined from a reference adjustment value and one or more compensation factors.

9. The method of claim 8, wherein the one or more compensation factors are associated with a reference signal configuration for the reference signal for which the CIR is estimated.

10. The method of claim 8, comprising adjusting the reference adjustment value using the one or more compensation factors to determine the adjustment value.

11. The method of claim 10, further comprising receiving the reference adjustment value from at least one of the one or more remote wireless nodes or from another node within the wireless communication network.

12. The method of claim 10, further comprising receiving the one or more threshold adjustments from at least one of the one or more remote wireless nodes or from another node within the wireless communication network.

13. The method of claim 2, wherein the peak threshold is defined responsive to the strength of the dominant peak and an adjustment function, said adjustment function comprising a function of a time difference between a dominant peak time and a candidate peak time.

14. The method of claim 13, wherein the adjustment function further comprises the function of the time difference between the dominant peak time and the candidate peak time as modified by an adjustment value.

15. The method of claim 13, wherein the adjustment function comprises a function inversely proportional to a square of the time difference.

16. The method of claim 2, wherein:

the peak threshold comprises a candidate peak threshold for each candidate peak in the search window including the dominant peak, wherein each candidate peak threshold is defined responsive to an adjustment function and a strength of the corresponding candidate peak and all preceding peaks in the search window and a corresponding adjustment function for each of the preceding peaks, said adjustment function comprising a function of a time difference between the candidate peak and the corresponding preceding peak; and wherein the identifying as the TOA peak the first peak in time within the search window that satisfies the threshold condition comprises:

iteratively comparing a strength of each candidate peak to the corresponding candidate peak threshold condition until no earlier candidate peaks exceeding the corresponding candidate peak threshold remain; and identifying the last candidate peak to exceed the corresponding candidate peak threshold as the TOA peak.

17. The method of claim 2, comprising calculating the peak threshold.

18. The method of claim 1, wherein the defining the threshold condition comprises defining the threshold condition responsive to one or more rules preconfigured for the wireless node.

19. The method of claim 18, wherein the one or more rules comprise one or more rules preconfigured per positioning reference signal, preconfigured per remote wireless node, and/or preconfigured per frequency.

20. The method of claim 19, wherein the peak threshold is calculated responsive to the strength of the dominant peak and at least one of:

a size of the search window;

a number of the one or more reference signals received from the one or more remote wireless nodes;

a comb configuration of each of the received one or more reference signals;

a reference signal density in frequency;

a reference signal density in time;

a reference signal bandwidth;

a number of repetitions of a reference signal within a reference signal period; and one or more characteristics of a wireless channel conveying the one or more reference signals to the wireless node.

21. The method of claim 1, wherein:

the coherently and jointly processing reference signals received via a plurality of frequency layers comprises a first coherently and jointly processing of the reference signals received from a first remote wireless node via a first plurality of frequency layers and a second coherently and jointly processing of the reference signals received from a second remote wireless node via a second plurality of frequency layers;

the estimating the CIR comprises estimating a first CIR within the search window responsive to the first coherently and jointly processed reference signals and estimating a second CIR within the search window responsive to the second coherently and jointly processed reference signals; and the defining the threshold condition comprises defining a first threshold condition responsive to a strength of a dominant peak of the first CIR within the search window and defining a second threshold condition responsive to a strength of a dominant peak of the second CIR within the search window.

22. The method of claim 1, wherein the strength of any peak in the search window comprises one of:

a peak value in a power delay profile of the CIR at a given sampling frequency;

a peak value in a power delay profile of the CIR after interpolation between samples;

a power delay profile of the CIR integrated over a period of time around the corresponding peak;

a power delay profile of the CIR summed over a number of samples around the corresponding peak; and a power delay profile of the CIR averaged over a number of samples around the corresponding peak.

23. The method of claim 22, wherein the power delay profile is based on an absolute value of the CIR.

* * * * *